United States Patent
Sridharan et al.

(10) Patent No.: US 10,951,283 B2
(45) Date of Patent: Mar. 16, 2021

(54) PAIRED SOUNDING REFERENCE SIGNAL TRANSMISSIONS IN MULTI-TRANSMISSION/RECEPTION POINT OPERATION

(71) Applicant: QUALCOMM Incorporated, San Diego, CA (US)

(72) Inventors: Gokul Sridharan, San Diego, CA (US); Jay Kumar Sundararajan, San Diego, CA (US); Yi Huang, San Diego, CA (US); Wei Yang, San Diego, CA (US); Joseph Binamira Soriaga, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/525,343

(22) Filed: Jul. 29, 2019

(65) Prior Publication Data

US 2020/0044705 A1 Feb. 6, 2020

Related U.S. Application Data

(60) Provisional application No. 62/713,718, filed on Aug. 2, 2018.

(51) Int. Cl.
*H04B 7/0456* (2017.01)
*H04L 5/00* (2006.01)
(Continued)

(52) U.S. Cl.
CPC ........... *H04B 7/0486* (2013.01); *H04B 7/028* (2013.01); *H04B 7/0617* (2013.01); *H04L 5/0048* (2013.01); *H04W 72/042* (2013.01)

(58) Field of Classification Search
CPC .... H04B 7/0486; H04B 7/028; H04B 7/0617; H04B 7/024; H04B 7/2687; H04L 5/0048;
(Continued)

(56) References Cited

U.S. PATENT DOCUMENTS 9,178,595 B2 * 11/2015 Kang ................... H04B 7/0639
2010/0239036 A1 * 9/2010 Koo ...................... H04L 5/0035
375/260

(Continued)

FOREIGN PATENT DOCUMENTS

CN 104168656 A * 11/2014
CN 106060950 A 10/2016
WO WO-2014038755 A1 3/2014

OTHER PUBLICATIONS

International Search Report and Written Opinion—PCT/US2019/044186—ISA/EPO—dated Nov. 13, 2019.

*Primary Examiner* — Sophia Vlahos
(74) *Attorney, Agent, or Firm* — Holland & Hart LLP QUALCOMM Incorporated

(57) ABSTRACT

Methods, systems, and devices for wireless communications are described. In some cases, a user equipment (UE) may use multiple antenna ports to communicate with multiple transmission/reception points (TRPs), and each antenna port may correspond to a spatial dimension along which wireless communications may be transmitted. The UE may transmit a first sounding reference signal (SRS) to a serving TRP to aid the serving TRP in determining a subset of spatial dimensions available to the UE along which to transmit downlink transmissions. Upon receiving a downlink transmission from the serving TRP along the subset of spatial dimensions as determined by the serving TRP, the UE may transmit a second SRS to a neighboring TRP to indicate the subset of spatial dimensions. The neighboring TRP avoid (Continued)

transmitting downlink transmissions to the UE or to other UEs along the subset of spatial dimensions, thereby mitigating interference along the subset of spatial dimensions.

29 Claims, 18 Drawing Sheets

(51) Int. Cl.
*H04W 72/04* (2009.01)
*H04B 7/06* (2006.01)
*H04B 7/02* (2018.01)

(58) Field of Classification Search
CPC ........ H04L 2001/0093; H04W 72/042; H04W 72/0413; H04W 72/1284; H04J 11/005; H04J 11/0023; H04J 11/0053
See application file for complete search history.

(56) References Cited

U.S. PATENT DOCUMENTS

| | | | |
|---|---|---|---|
| 2010/0248712 A1 | 9/2010 | Lee et al. | |
| 2011/0306381 A1* | 12/2011 | Jia | H04W 52/40 455/522 |
| 2012/0140652 A1* | 6/2012 | Pan | H04B 7/15592 370/252 |
| 2012/0258752 A1 | 10/2012 | Liao | |
| 2012/0275411 A1* | 11/2012 | Kim | H04L 5/0032 370/329 |
| 2014/0105150 A1* | 4/2014 | Kim | H04L 5/001 370/329 |
| 2018/0041317 A1* | 2/2018 | Simonsson | H04W 72/044 |

\* cited by examiner

US 10,951,283 B2

PAIRED SOUNDING REFERENCE SIGNAL TRANSMISSIONS IN MULTI-TRANSMISSION/RECEPTION POINT OPERATION

CROSS REFERENCE

The present Application for Patent claims the benefit of U.S. Provisional Patent Application No. 62/713,718 by Sridharan, et al., entitled "PAIRED SOUNDING REFERENCE SIGNAL TRANSMISSIONS IN MULTI-TRANSMISSION/RECEPTION POINT OPERATION," filed Aug. 2, 2018, assigned to the assignee hereof, and expressly incorporated herein.

BACKGROUND

The following relates generally to wireless communications, and more specifically to paired sounding reference signal (SRS) transmissions in multi-transmission/reception point (TRP) operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, one or more base stations may act as or utilize one or more TRPs to transmit information to UE. The TRPs may coordinate (e.g., dynamically or semi-statically) communications to the UE, or, in some cases, the TRPs may communicate with the UE in a non-coherent (e.g., disjoint) manner. Also, some wireless communications systems may operate in millimeter wave (mmW) frequency ranges (e.g., 28 GHz, 40 GHz, or 60 GHz). Wireless communications at these frequencies may be associated with increased signal attenuation (e.g., path loss), which may be influenced by various factors, such as temperature, barometric pressure, and diffraction. As a result, signal processing techniques, such as beamforming, may be used to coherently combine energy and overcome the path losses at these frequencies. Due to the increased amount of path loss in mmW communication systems, transmissions from the base station and/or the UE may be beamformed. Conventional techniques for interference management are deficient.

SUMMARY

The described techniques relate to improved methods, systems, devices, and apparatuses that support paired sounding reference signal (SRS) transmissions in multi-transmission/reception point (TRP) operation. Generally, the described techniques provide for a user equipment (UE) to transmit multiple SRSs to facilitate interference mitigation among multiple TRPs.

In some cases, a UE may use multiple antenna ports to transmit uplink transmissions to, and receive downlink transmissions from, one or more TRPs. Each antenna port may correspond to a spatial dimension along which wireless communications may be transmitted and received. The spatial dimensions corresponding to the antenna ports of the UE may define an available signal space of the UE. In some cases, downlink transmissions from a first TRP to a UE may occupy a subset of the spatial dimensions of the available signal space, and this subset may be referred to as a received signal space. The UE may transmit an SRS to indicate the received signal space to a second TRP for reducing interference caused by the second TRP to downlink transmissions from the first TRP to the UE.

In an example, the UE may transmit a first SRS to a serving TRP of the UE using one or more of the antenna ports of the UE. The serving TRP of the UE may determine to precode and beamform downlink transmissions to the UE based on the first SRS. The serving TRP may transmit the precoded downlink transmissions to the UE, and the UE may receive the downlink transmissions on one or more antenna ports of the UE. Based on energy detection at the one or more antenna ports on which the downlink transmissions are received, the UE may determine the received signal space. The received signal space may correspond to the one or more antenna ports, and associated spatial dimensions, along which the UE receives downlink transmissions from the serving TRP. To mitigate and/or reduce interference from downlink transmissions from neighboring TRPs along the received signal space, the UE may transmit a second SRS to one or more neighboring TRPs, where the second SRS is precoded to indicate at least one dimension of the received signal space corresponding to the received signal space.

A neighboring TRP may use the second SRS to generate one or more downlink transmissions to other UEs that reduces interference along the received signal space, and hence mitigates interference caused to downlink transmissions from the serving TRP to the UE. In some cases, the second SRS may convey the received signal space of the UE (e.g., the signal space that corresponds to received downlink transmission between the UE and the serving TRP). Based on the second SRS, a neighboring TRP may determine one or more spatial dimensions that correspond to unused signal space of the available signal space of the UE (e.g., a portion of the available signal space of the UE that does not include the received signal space), and transmit a downlink transmission to one or more other UEs along the determined one or more spatial dimensions that correspond to the unused signal space of the UE. Beneficially, interference caused by the one or more downlink transmissions from the one or more neighboring TRPs may be mitigated along the received signal space of the UE.

In some cases, the second SRS may be used to indicate an unused signal space of the available signal space of the UE in which a second serving TRP may send a downlink transmission to the UE. Based on the second SRS, the second serving TRP may determine one or more spatial dimensions that correspond to the unused signal space, and transmit downlink transmissions to the UE along the one or more spatial dimensions. Beneficially, interference caused by the one or more downlink transmissions from the second serving TRP may be mitigated along the received signal space in which the serving TRP transmits its one or more downlink transmissions to the UE, and thus the UE may be able to decode transmission from both serving TRPs.

A method of wireless communication at a UE is described. The method may include transmitting a first SRS to a first TRP, receiving, from the first TRP, a downlink transmission that is based on the first SRS, and transmitting, to a second TRP, a second SRS that is precoded to indicate at least one dimension of a received signal space corresponding to the downlink transmission.

An apparatus for wireless communication at a UE is described. The apparatus may include a processor, memory in electronic communication with the processor, and instructions stored in the memory. The instructions may be executable by the processor to cause the apparatus to transmit a first SRS to a first TRP, receive, from the first TRP, a downlink transmission that is based on the first SRS, and transmit, to a second TRP, a second SRS that is precoded to indicate at least one dimension of a received signal space corresponding to the downlink transmission.

Another apparatus for wireless communication at a UE is described. The apparatus may include means for transmitting a first SRS to a first TRP, receiving, from the first TRP, a downlink transmission that is based on the first SRS, and transmitting, to a second TRP, a second SRS that is precoded to indicate at least one dimension of a received signal space corresponding to the downlink transmission.

A non-transitory computer-readable medium storing code for wireless communication at a UE is described. The code may include instructions executable by a processor to transmit a first SRS to a first TRP, receive, from the first TRP, a downlink transmission that is based on the first SRS, and transmit, to a second TRP, a second SRS that is precoded to indicate at least one dimension of a received signal space corresponding to the downlink transmission.

In some examples of the method, apparatuses, and non-transitory computer-readable medium described herein, transmitting the first SRS further may include operations, features, means, or instructions for transmitting the first SRS from a set of antenna ports, and where transmitting the second SRS further includes and transmitting the second SRS from at least a subset of the set of antenna ports.

Some examples of the method, apparatuses, and non-transitory computer-readable medium described herein may further include operations, features, means, or instructions for receiving a second downlink transmission from the second TRP based on the second SRS.

In some examples of the method, apparatuses, and non-transitory computer-readable medium described herein, transmitting the second SRS further may include operations, features, means, or instructions for precoding the second SRS for transmission along at least one dimension of the received signal space.

In some examples of the method, apparatuses, and non-transitory computer-readable medium described herein, the received signal space includes one or more dimensions of an available signal space of the UE that may be spanned by a signal including the downlink transmission.

In some examples of the method, apparatuses, and non-transitory computer-readable medium described herein, transmitting the second SRS further may include operations, features, means, or instructions for precoding the second SRS for transmission along a dimension that may be not contained in the at least one dimension of the received signal space.

In some examples of the method, apparatuses, and non-transitory computer-readable medium described herein, transmitting the second SRS further may include operations, features, means, or instructions for determining a rank of the downlink transmission, a precoding of the downlink transmission, or both and transmitting the second SRS based on the rank of the downlink transmission, the precoding of the downlink transmission, or both.

Some examples of the method, apparatuses, and non-transitory computer-readable medium described herein may further include operations, features, means, or instructions for receiving control signaling that indicates a rank of the downlink transmission, a resource block allocation, or both.

Some examples of the method, apparatuses, and non-transitory computer-readable medium described herein may further include operations, features, means, or instructions for receiving, from the first TRP, control signaling indicating a resource set configuration for the first SRS.

In some examples of the method, apparatuses, and non-transitory computer-readable medium described herein, the control signaling indicates a second resource set configuration for the second SRS.

In some examples of the method, apparatuses, and non-transitory computer-readable medium described herein, the resource set configuration indicates at least one parameter that may be common to the first SRS and the second SRS.

Some examples of the method, apparatuses, and non-transitory computer-readable medium described herein may further include operations, features, means, or instructions for receiving, from the second TRP, second control signaling indicating a second resource set configuration for the second SRS.

Some examples of the method, apparatuses, and non-transitory computer-readable medium described herein may further include operations, features, means, or instructions for transmitting a third SRS to the first TRP, receiving, from the first TRP, a second downlink transmission that may be based on the third SRS and transmitting, to the second TRP, a fourth SRS that may be precoded to indicate a second at least one dimension of the received signal space corresponding to the second downlink transmission, where a rank of the downlink transmission differs from a rank of the second downlink transmission.

In some examples of the method, apparatuses, and non-transitory computer-readable medium described herein, an order in which the first SRS and the second SRS may be transmitted in time may be based on a priority metric.

In some examples of the method, apparatuses, and non-transitory computer-readable medium described herein, the downlink transmission may be a beamformed downlink transmission.

In some examples of the method, apparatuses, and non-transitory computer-readable medium described herein, the downlink transmission may be a physical downlink shared channel transmission.

A method of wireless communication at a first TRP including is described. The method may include receiving, from a first UE, a first SRS that is precoded to indicate at least one dimension of a received signal space corresponding to a first downlink transmission from a second TRP to the first UE and transmitting a second downlink transmission based on the first SRS.

An apparatus for wireless communication at a first TRP including is described. The apparatus may include a processor, memory in electronic communication with the processor, and instructions stored in the memory. The instructions may be executable by the processor to cause the apparatus to receive, from a first UE, a first SRS that is precoded to indicate at least one dimension of a received signal space corresponding to a first downlink transmission from a second TRP to the first UE and transmit a second downlink transmission based on the first SRS.

Another apparatus for wireless communication at a first TRP including is described. The apparatus may include means for receiving, from a first UE, a first SRS that is precoded to indicate at least one dimension of a received signal space corresponding to a first downlink transmission from a second TRP to the first UE and transmitting a second downlink transmission based on the first SRS.

A non-transitory computer-readable medium storing code for wireless communication at a first TRP including is described. The code may include instructions executable by a processor to receive, from a first UE, a first SRS that is precoded to indicate at least one dimension of a received signal space corresponding to a first downlink transmission from a second TRP to the first UE and transmit a second downlink transmission based on the first SRS.

In some examples of the method, apparatuses, and non-transitory computer-readable medium described herein, transmitting the second downlink transmission further may include operations, features, means, or instructions for transmitting the second downlink transmission to a second UE along a dimension determined based on first SRS.

In some examples of the method, apparatuses, and non-transitory computer-readable medium described herein, transmitting the second downlink transmission further may include operations, features, means, or instructions for transmitting the second downlink transmission to the first UE via the at least one dimension indicated by the first SRS.

In some examples of the method, apparatuses, and non-transitory computer-readable medium described herein, transmitting the second downlink transmission further may include operations, features, means, or instructions for determining a rank of the first SRS, a precoding of the first SRS, or both and transmitting the second downlink transmission based on the rank of the first SRS, the precoding of the first SRS, or both.

In some examples of the method, apparatuses, and non-transitory computer-readable medium described herein, transmitting the second downlink transmission further may include operations, features, means, or instructions for determining at least one spatial parameter based on the first SRS and transmitting the second downlink transmission based on the at least one spatial parameter.

Some examples of the method, apparatuses, and non-transitory computer-readable medium described herein may further include operations, features, means, or instructions for receiving, from the second TRP, a resource set configuration for a second SRS and transmitting control signaling to configure the first UE to transmit the first SRS based on the resource set configuration.

In some examples of the method, apparatuses, and non-transitory computer-readable medium described herein, the resource set configuration indicates at least one parameter that may be common to the first SRS and the second SRS.

In some examples of the method, apparatuses, and non-transitory computer-readable medium described herein, transmitting the control signaling further may include operations, features, means, or instructions for transmitting, to the first UE, the control signaling indicating a second resource set configuration based on the resource set configuration.

In some examples of the method, apparatuses, and non-transitory computer-readable medium described herein, an order in which the first SRS and a second SRS may be transmitted in time may be based on a priority metric.

In some examples of the method, apparatuses, and non-transitory computer-readable medium described herein, each of the first downlink transmission and the second downlink transmission may be a beamformed downlink transmission.

In some examples of the method, apparatuses, and non-transitory computer-readable medium described herein, each of the first downlink transmission and the second downlink transmission may be a physical downlink shared channel transmission.

DETAILED DESCRIPTION

Figure 1:
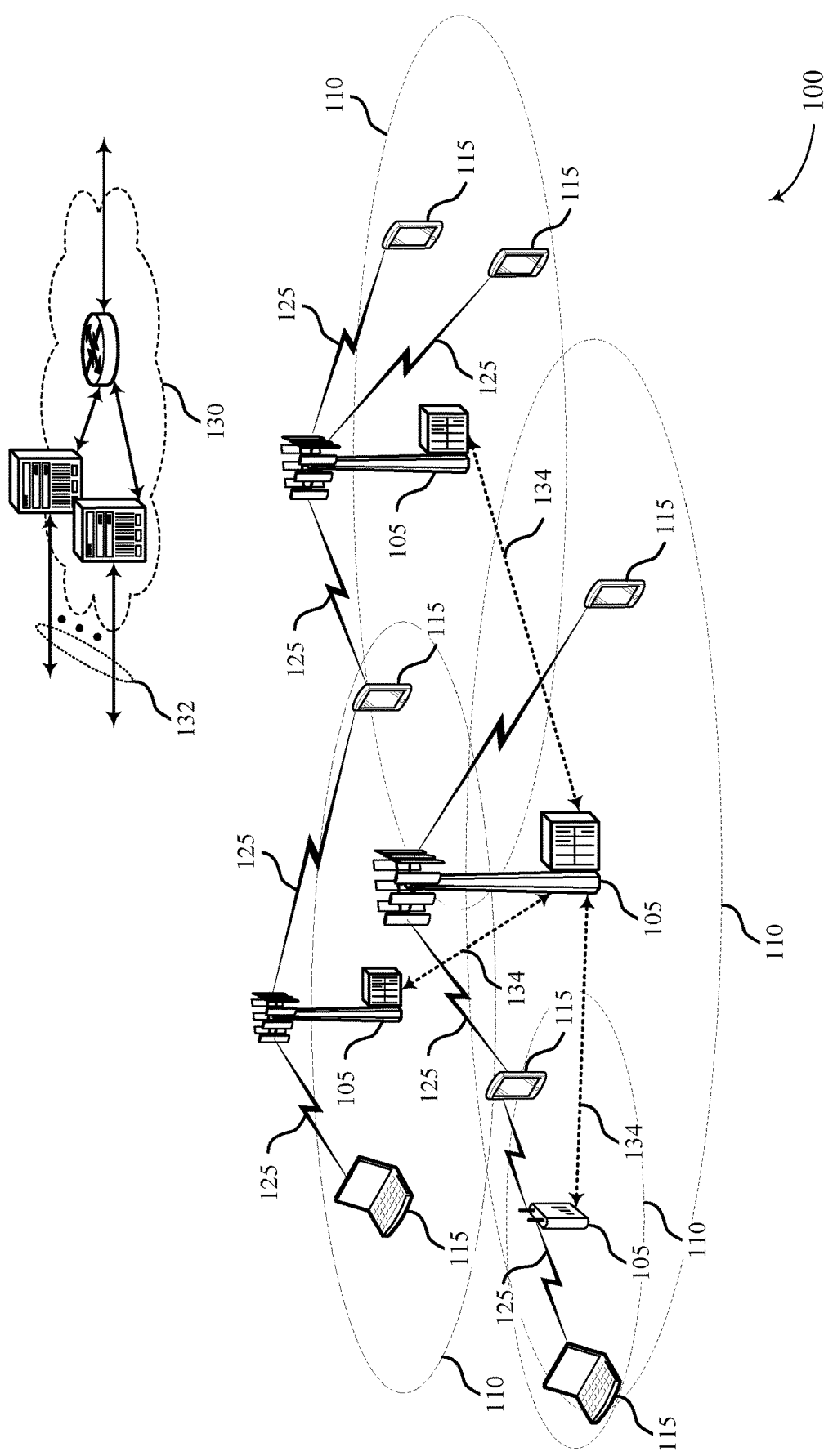
FIGS. 1 and 2 illustrate examples of wireless communications systems that support paired sounding reference signal (SRS) transmissions in multi-transmission/reception point (TRP) operation in accordance with aspects of the present disclosure.

The described techniques relate to improved methods, systems, devices, or apparatuses that support paired sounding reference signal (SRS) transmission in multi-transmission/reception point (TRP) operation. Generally, the described techniques provide for a user equipment (UE) to transmit multiple SRSs to facilitate interference mitigation among multiple TRPs. Some wireless communications system may utilize multi-TRP operation, such that multiple TRPs may communicate with one or more UEs. Also, some wireless communications systems may utilize beamforming techniques to process wireless communications transmitted in millimeter wave (mmW) frequency ranges (e.g., 28 GHz, 40 GHz, or 60 GHz). When utilizing beamforming techniques, a base station may transmit directional transmissions (e.g., beams) to a UE, where the directional transmissions are less time dispersive than transmissions of conventional wireless communications systems (e.g., sub-6 GHz wireless communications systems such as Long Term Evolution (LTE)). In some cases, the backhaul links that facilitate downlink transmission coordination and interference management between multiple TRPs may have increased latency such that coordination between the multiple TRPs is limited. In such cases, a UE may facilitate downlink coordination and interference management between the multiple TRPs through the transmission of multiple SRSs.

In some cases, a UE may use multiple antenna ports to transmit uplink transmissions to, and receive downlink transmissions from, one or more TRPs. Each antenna port may correspond to a spatial dimension along which wireless communications may be transmitted and received. The spatial dimensions corresponding to the antenna ports of the UE may define an available signal space of the UE. In some cases, downlink transmissions from a first TRP to a UE may occupy a subset of the spatial dimensions of the available signal space, and this subset may be referred to as a received signal space. The UE may transmit an SRS to indicate the received signal space to a second TRP for reducing interference caused to downlink transmissions from the first TRP to the UE.

In an example, a UE may transmit a first SRS, which may be referred to as a primary SRS (pSRS), to a serving TRP. The UE may transmit the pSRS with up to every antenna port of the UE, where each antenna port may correspond to a different spatial dimension (e.g., the X spatial dimension, the Y spatial dimension, and the Z spatial dimension) within an available signal space in which the UE may receive transmissions from one or more TRPs. The serving TRP may receive the pSRS on one or more antenna ports. Based on energy detected at one or more of the antenna ports of the serving TRP, the serving TRP may determine spatial dimensions within the available signal space of the UE. The serving TRP may determine to precode and beamform a downlink transmission based on the determined spatial dimensions. The serving TRP may, for example, precode symbols of the downlink transmission to be transmitted via a subset of its available antenna ports, and may set one or more spatial parameters to beamform the downlink transmission in the direction of the UE such that the downlink transmission occupies at least a portion the available signal space of the UE.

The serving TRP may then transmit a downlink transmission to the UE based on the precoding and beamforming, and the UE may receive the downlink transmission within an available signal space of the UE. The UE may determine a received signal space in which the UE receives the downlink signal based on energy detected at the respective antenna ports of the UE. The received signal space may correspond to the antenna ports that define the spatial dimensions along which the downlink transmission from the serving TRP may be received, and may be a subset of the available signal space defined by the antenna ports of the UE. The UE may then transmit a second SRS, which may be referred to as a secondary SRS (sSRS), to a neighboring TRP. The UE may transmit the sSRS on one or more antenna ports that correspond to the received signal space such that the sSRS indicates (e.g., conveys) the received signal space to the neighboring TRP.

The neighboring TRP may then precode and beamform downlink transmissions to other UEs such that the downlink transmissions to the other UEs are not transmitted along, nor significantly interfere with, the received signal space of the UE. Because wireless channel conditions may change over time, the serving TRP may change over time the spatial dimensions along which the serving TRP transmits a downlink transmission to the UE (e.g., modify precoding, spatial parameters for beamforming, or the like), and the UE may update the determined received signal space based on the latest downlink transmission received from the serving TRP. The UE may then adjust the sSRS to reflect the changed received signal space. Thus, the sSRS may change from one transmission to the next based on the received signal space of the UE, which may be based on the precoding used by the serving TRP to transmit downlink transmissions (e.g., as determined based on the pSRS). Thus, the sSRS generated by the UE may be dependent on the pSRS. Such a process may aid in interference management when a wireless communications system utilizes multi-TRP interference management (MTIC) operation.

In some cases, the UE may transmit a pSRS and an sSRS to a serving TRP and a neighboring TRP, respectively, such that the serving TRP and the neighboring TRP determine the received signal space of the UE. Based on the determination of the received signal space, the neighboring TRP may precode and beamform one or more downlink transmissions to the UE such that the one or more downlink transmissions do not interfere with one or more downlink transmissions from the serving TRP at the received signal space of the UE.

In some cases, a UE may transmit a first pSRS ($p_1$SRS), to a first serving TRP. The UE may transmit the $p_1$SRS with up to every antenna port of the UE, where each antenna port may correspond to a spatial dimension (e.g., the X spatial dimension, the Y spatial dimension, and the Z spatial dimension) within an available signal space. The first serving TRP may receive the $p_1$SRS on one or more antenna ports. Based on energy detected at one or more of the antenna ports of the serving TRP, the first serving TRP may determine the spatial dimensions within the available signal space of the UE. The first serving TRP may determine to precode and beamform a downlink transmission based on the determined spatial dimensions. The first serving TRP may, for example, precode symbols of the downlink transmission to be transmitted via a subset of its available antenna ports, and may set one or more spatial parameters to beamform the downlink transmission in the direction of the UE such that the downlink transmission occupies at least a portion of the available signal space of the UE.

The first serving TRP may then transmit a downlink transmission to the UE based on the precoding and beamforming, and the UE may receive the downlink transmission within an available signal space of the UE. The UE may determine a received signal space in which the UE receives the downlink transmission (e.g., downlink signal) based on energy detected at the respective antenna ports of the UE. The received signal space may correspond to the antenna ports that define the spatial dimensions along which the downlink transmission from the first serving TRP may be received, and may be a subset of the available signal space defined by the antenna ports of the UE. The UE may then transmit a second pSRS ($p_2$SRS) to a second serving TRP. The UE may transmit the $p_2$SRS on one or more antenna ports to indicate the unused signal space of the available signal space to the second serving TRP.

The second serving TRP may then precode and beamform a downlink transmission to the UE to lessen interference with a downlink transmission from the serving TRP along the received signal space of the UE. Beneficially, interference caused by the one or more downlink transmissions from the second serving TRP may be mitigated along the received signal space in which the serving TRP transmits its one or more downlink transmissions to the UE, and thus the UE may be able to decode transmission from both serving TRPs.

In some cases, the first serving TRP may change over time the spatial dimensions along which the first serving TRP transmits a downlink transmission to the UE, and the UE may update the determined received signal space based on the latest downlink transmission received from the first serving TRP. The UE may then adjust the $p_2$SRS to reflect the changed received signal space. Thus, the $p_2$SRS may change from one transmission to the next based on the received signal space of the UE, which may be based on the precoding used by the first serving TRP to transmit downlink transmissions (e.g., as determined based on the $p_1$SRS). As such, the $p_2$SRS may be dependent on the $p_1$SRS. Such a process may aid in interference management when a wireless communications system utilizes non-coherent joint transmission (NCJT) operation.

Aspects of the disclosure are initially described in the context of wireless communications systems. Aspects of the disclosure are then described in the context of process flows and transmission time interval (TTI) configurations. Aspects of the disclosure are further illustrated by and described with reference to apparatus diagrams, system diagrams, and flowcharts that relate to paired SRS transmissions in multi-TRP operation.

FIG. 1 illustrates an example of a wireless communications system 100 that supports paired SRS transmissions in multi-TRP operation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, or NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may use multiple antenna ports to transmit uplink transmissions to, and receive downlink transmissions from, one or more TRPs. Each antenna port may correspond to a spatial dimension along which wireless communications may be transmitted and received. The spatial dimensions corresponding to the antenna ports of the UE 115 may define an available signal space of the UE 115. In some cases, downlink transmissions from a first TRP to a UE 115 may occupy a subset of the spatial dimensions of the available signal space, and this subset may be referred to as a received signal space. The UE 115 may transmit an SRS to indicate the received signal space to a second TRP for reducing interference caused to downlink transmissions from the first TRP to the UE 115.

A UE 115 may provide for coupled transmission of pSRS and sSRS. In an example, UE 115 may transmit a pSRS to a serving TRP. The UE 115 may transmit the pSRS with up to every antenna port available to the UE 115, where each antenna port may correspond to a spatial dimension (e.g., the X spatial dimension, the Y spatial dimension, and the Z spatial dimension) within an available signal space in which the UE may receive transmissions from one or more TRPs. The serving TRP may receive the pSRS on one or more antenna ports. Based on energy detected at one or more of the antenna ports of the serving TRP, the serving TRP may determine the spatial dimensions within the available signal space of the UE 115. The serving TRP may determine to precode and beamform downlink transmissions based on the determined spatial dimensions. The serving TRP may, for example, precode symbols of the downlink transmission to be transmitted via a subset of its available antenna ports, and may set one or more spatial parameters to beamform the downlink transmission in the direction of the UE such that the downlink transmission occupies at least a portion the available signal space of the UE.

The serving TRP may then transmit a downlink transmission to the UE 115 based on the precoding and beamforming, and the UE 115 may receive the downlink transmission within an available signal space of the UE 115. The UE 115 may determine a received signal space in which the UE receives the downlink signal based on energy detected at the respective antenna ports of the UE 115. The received signal space may correspond to the antenna ports that define the spatial dimensions along which the downlink transmissions from the serving TRP may be received, and may be a subset of the available signal space defined by the antenna ports of the UE.

The UE 115 may then transmit an sSRS in a coupled manner to a neighboring TRP. The UE 115 may transmit the sSRS on one or more antenna ports that correspond to the received signal space such that the sSRS indicates (e.g., conveys) the received signal space to the neighboring TRP.

The neighboring TRP may then precode and beamform downlink transmissions to other UE 115s such that the downlink transmissions to the other UE 115s are not transmitted along, and/or do not significantly interfere with, the received signal space of the UE 115. Because wireless channel conditions may change over time, the serving TRP may change over time the spatial dimensions along which the serving TRP transmits a downlink transmission to the UE, the UE may update the determined received signal space based on the latest downlink transmission received from the serving TRP. The UE may then adjust the sSRS to reflect the changed received signal space. Thus, the sSRS may change from one transmission to the next based on the received signal space of the UE 115 such that the sSRS may be dependent on the pSRS. Such a process may aid in interference management when a wireless communications system utilizes MTIC operation.

In some cases, the UE 115 may decouple transmission of a pSRS and an sSRS to a serving TRP and a neighboring TRP, respectively, such that the serving TRP and the neighboring TRP determine the received signal space of the UE 115. Based on the determination of the received signal space of the UE 115, the neighboring TRP may precode and beamform a downlink transmission to the UE 115 such that the downlink transmission is not transmitted along, and/or does not significantly interfere with, the received signal space of the UE 115.

In some cases, a UE 115 may transmit a first pSRS ($p_1$SRS), to a serving TRP. The UE 115 may transmit the $p_1$SRS with up to every antenna port of the UE 115, where each antenna port may correspond to a spatial dimension (e.g., the X spatial dimension, the Y spatial dimension, and the Z spatial dimension) within an available signal space. The serving TRP may receive the $p_1$SRS on one or more antenna ports. Based on energy detected at one or more of the antenna ports of the serving TRP, the serving TRP may determine the spatial dimensions within the available signal space of the UE 115. The serving TRP may determine to precode and beamform a downlink transmission based on the determined spatial dimensions. The serving TRP may, for example, precode symbols of the downlink transmission to be transmitted via a subset of its available antenna ports, and may set one or more spatial parameters to beamform the downlink transmission in the direction of the UE such that the downlink transmission occupies at least a portion of the available signal space of the UE.

The serving TRP may then transmit downlink transmission to the UE 115 based on the precoding and beamforming, and the UE 115 may receive the downlink transmissions within an available signal space of the UE 115. The UE 115 may determine a received signal space in which the UE 115 receives the downlink signal based on energy detected at the respective antenna ports of the UE 115. The received signal space may correspond to the antenna ports that define the spatial dimensions along which the downlink transmissions from the serving TRP may be received. The UE 115 may then transmit a second pSRS ($p_2$SRS) to a neighboring TRP. The UE 115 may transmit the $p_2$SRS on one or more antenna ports to indicate the unused signal space of the available signal space to the neighboring TRP.

The neighboring TRP may then precode and beamform a downlink transmission the UE 115 to lessen interference with a downlink transmission from the serving TRP along the received signal space of the UE 115. Because wireless channel conditions may change over time, the serving TRP may change over time the spatial dimensions along which the serving TRP transmits a downlink transmission to the UE, the UE may update the determined received signal space based on the latest downlink transmission received from the serving TRP. The UE may then adjust the $p_2$SRS to reflect the changed received signal space. Thus, the $p_2$SRS may change from one transmission to the next based on the received signal space of the UE 115 such that the $p_2$SRS may be dependent on the $p_1$SRS. Such a process may aid in interference management when a wireless communications system utilizes NCJT operation.

Figure 2:
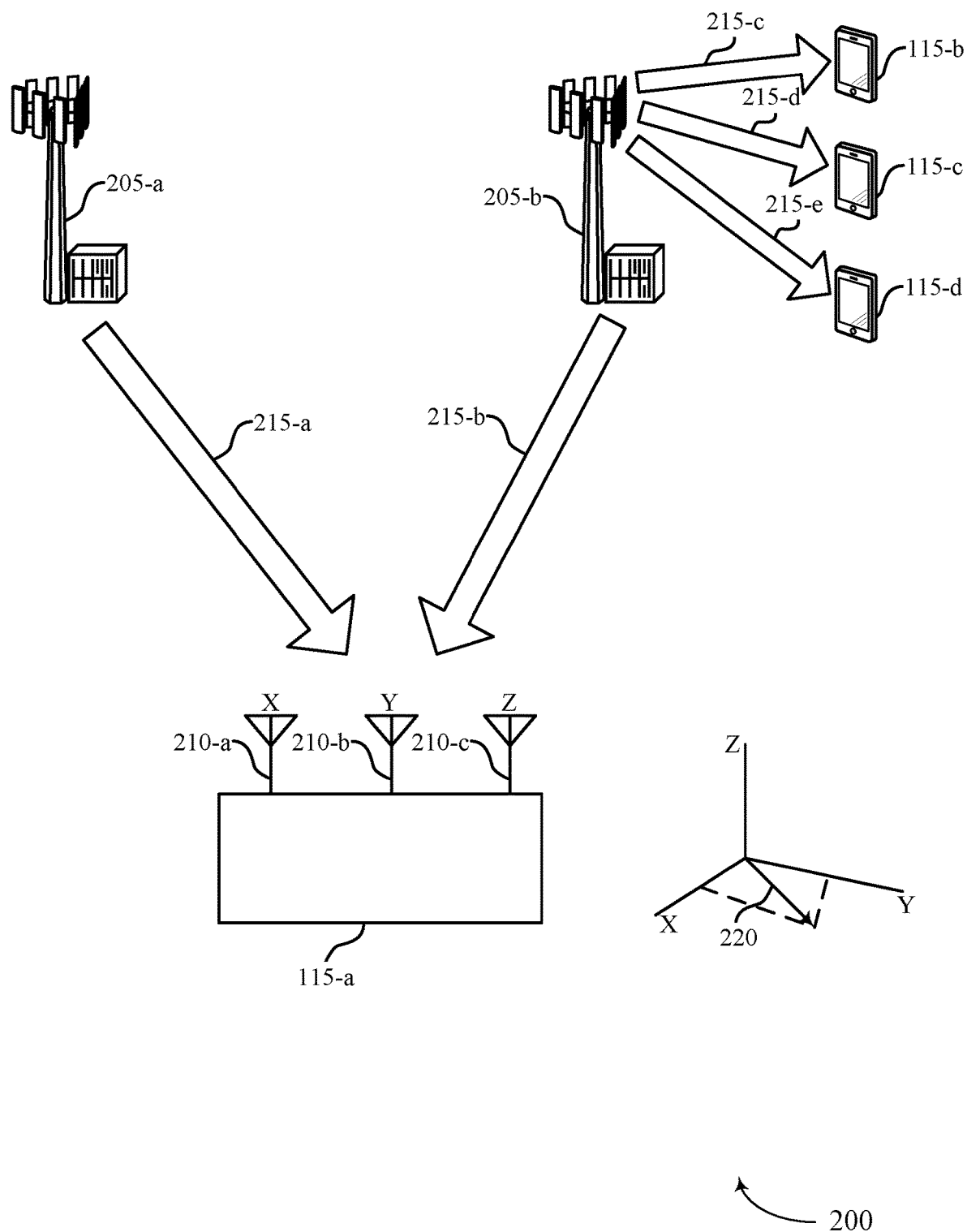

FIG. 2 illustrates an example of a wireless communications system 200 that supports paired SRS transmissions in multi-TRP operation in accordance with aspects of the present disclosure. In some examples, wireless communications system 200 may implement aspects of wireless communication system 100. Wireless communications system 200 may include multiple TRPs 205 (e.g., TRP 205-a and TRP 205-b) in communication with one or more UEs 115 (e.g., UEs 115-a, 115-b, 115-c, and 115-d). TRP 205-a and TRP 205-b may each be an example of a base station 105 as described herein.

In wireless communications system 200, multiple TRPs 205 may be configured to communicate with one or more UEs 115. Such multi-TRP operation may increase the throughput to a UE 115 by allowing for higher rank transmission (e.g., the use of multiple antenna ports to transmit and receive communications), and may increase transmission diversity and transmission reliability. In some cases, wireless communications system 200 may utilize multiple TRPs 205 for NCJT. NCJT may be a mode of multi-TRP operation where multiple TRPs coordinate to transmit data to a UE 115, which may relax the synchronization and backhaul coordination requirements between TRPs 205 compared to joint data transmission. Multi-TRP operation may also be used for multi-TRP interference coordination (MTIC). In MTIC, a UE 115 may receive data from one or more TRPs 205 while actively engaging with other neighboring TRPs 205 to manage (e.g., mitigate or reduce) interference of the UE 115. In both NCJT operation and MTIC operation, the wireless channels from a UE 115 to all TRPs 205 involved in multi-TRP operation may be determined (e.g., learned). With NCJT, for example, knowledge of the wireless channels between a UE 115 and serving TRPs 205 may enable the use of beamformed transmissions between the UE 115 and the TRPs 205, which may increase the received signal strength and reduce (e.g., minimize) the overall interference of the communications between the UE 115 and the TRPs 205. With MTIC, for example, knowledge of the wireless channels between a UE 115 and serving TRPs 205 may allow the UE 115 and the TRPs 205 to leverage the large number of spatial dimensions (e.g., corresponding to multiple antenna ports 210) available to TRPs 205 to implement a more fine-grained approach to interference management.

TRPs 205 and UEs 115 may utilize multiple antenna ports 210 when transmitting and receiving communications. Each antenna 210 may correspond to a spatial dimension associated with an available signal space of a UE 115 or a TRP 205. For example, UE 115-a may use antenna ports 210-a, 210-b, and 210-c when communicating with TRPs 205, and the antenna ports 210-a, 210-b, and 210-c may define an available signal space via which the UE 115-a may receive a downlink transmission from a TRP 205. In an example, antenna port 210-a may correspond to the X spatial dimension of the available signal space of UE 115-a, antenna port 210-b may correspond to the Y spatial dimension of the available signal space of UE 115-a, and antenna port 210-c may correspond to the Z spatial dimension of the available signal space of UE 115-a. It should be understood that antenna ports 210-a, 210-b, and 210-c are examples, and a UE 115 may include N antenna ports 210, where N is an integer. In such a case, the available signal space of the UE 115 may include N spatial dimensions, where each antenna port 210 corresponds to one spatial dimension.

One or more TRPs 205 may transmit downlink transmissions 215 to UEs 115, and each downlink transmission may be transmitted along one or more spatial dimensions of the available signal space of the UEs 115. For example, TRP 205-a may transmit downlink transmission 215-a to UE 115-a. UE 115-a may receive downlink transmission 215 with antenna ports 210-a, 210-b, and 210-c. Based on the energy detected at each antenna port 210, UE 115-a may determine three-dimensional vector representation 220 of downlink transmission 215-a. In some examples, UE 115-a may determine that three-dimensional vector representation 220 of downlink transmission 215-a resides primarily in the XY plane (e.g., due to greater energy detection at antenna ports 210-a and 210-b than antenna 210-c). In such a case, the XY plane (e.g., the spatial dimensions along which downlink transmission 215-a primarily resides) may be referred to as the received signal space of UE 115-a.

UE 115-a may receive interference on downlink transmission 215-a when one or more other downlink transmissions 215 comprise strong X-dimension and/or Y-dimension components in the available signal space of UE 115-a (e.g., when one or more other downlink transmissions 215 have components in the received signal space of UE 115-a). For example, UE 115-a may receive downlink transmission 215-b from TRP 205-b on antenna ports 210-a, 210-b, and 210-c at the same time as receiving downlink transmission 215-a. When downlink transmission 215-b has strong X-dimension and/or Y-dimension components in the available signal space of UE 115-a (e.g., when downlink transmission 215-b has components in the received signal space of UE 115-a), the received signal space of UE 115-a antenna ports may become crowded such that downlink transmission 215-b interferes with downlink transmission 215-a.

In some cases, downlink transmissions 215 transmitted to other UEs 115 may interfere with downlink transmissions 215 transmitted to UE 115-a. For example, TRP 205-b may transmit downlink transmission 215-c to UE 115-b, may transmit downlink transmission 215-d to UE 115-c, and may transmit downlink transmission 215-e to UE 115-d. When one or more of downlink transmissions 215-c, 215-d, and 215-e have strong X-dimension and/or Y-dimension components, the received signal space of UE 115-a antenna ports may become crowded such that downlink transmissions 215-*a* receives interference. Interference management techniques may be used to improve throughput and reliability of downlink transmissions 215 in such cases of interference between downlink transmissions 215 within a signal space of a UE 115. In some cases, throughput and/or reliability of a downlink transmission to a UE 115 may be improved if interference from a neighboring TRP is mitigated.

Conventional interference management techniques may use power control procedures to modify the power used to transmit downlink transmissions 215. In the example described above where one or more downlink transmissions 215 transmitted by TRP 205-*b* interfere with downlink transmission 215-*a* at UE 115-*a*, TRP 205-*b* may determine to reduce the power of its transmitted downlink transmissions 215 (e.g., downlink transmissions 215-*b*, 215-*c*, 215-*d*, and 215-*e*). This form of interference mitigation may negatively affect the communications between TRP 205-*b* and one or more other UEs 115, however. For example, TRP 205-*b* may transmit downlink transmission 215-*c* to UE 115-*b*, may transmit downlink transmission 215-*d* to UE 115-*c*, and may transmit downlink transmission 215-*e* to UE 115-*d*. When TRP 205 uses power control techniques for interference management, the received signal power at UEs 115-*b*, 115-*c*, and 115-*d* may be reduced in a significant, undesirable manner and may not be a feasible approach to reduce interference at a UE 115. Also, conventional multi-TRP operations may require all TRPs within a wireless communications system to transmit data, which may limit interference management operation when only interference management is desired.

The proposed techniques herein describe spatial interference mitigation techniques which may leverage spatial dimensions at TRPs 205 and UEs 115 to provide a more fine-tuned approach to interference mitigation than conventional power control techniques. Spatial interference mitigation techniques may use beamforming and precoding to direct interfering transmissions away from a first UE 115 while minimizing the impact to other UEs 115 served by a different TRP. In some cases, a UE 115 may transmit one or more sounding reference signals (SRSs) to multiple TRPs to aid in spatial interference mitigation techniques without negatively affecting the communications between one or more TRPs 205 and one or more other UEs 115. TRPs 205 and UEs 115 may use SRSs to estimate wireless channels between devices in TDD systems assuming channel reciprocity. In NCJT operation, a UE 115 may transmit one or more SRSs to multiple TRPs 205 to make possible coordinated beamforming between the TRPs 205. In MTIC, a UE 115 may transmit a dedicated SRS transmission to a TRP 205 engaged in multi-TRP operation that causes significant interference at the UE 115. The dedicated SRS may indicate channel information at the UE 115, which may allow the TRP 205 to make corrective actions (e.g., zero-forced beamforming) to reduce interference at the UE 115. In such a case, the UE 115 may indicate (e.g., convey) the received signal space that the UE 115 desires to keep free of interference (e.g., the signal space that is used by downlink transmissions 215 from serving TRPs 205). In some cases, the SRS transmitted for interference coordination may be referred to as a secondary SRS (sSRS). The sSRS may be introduced for spatial interference mitigation. A UE 115 may further transmit SRS to a serving TRP 205, and this SRS may be referred to as a primary SRS (pSRS). In such cases, wireless communications system 200 may allow multi-TRP operation even when only interference management operation is desired. Thus, multi-TRP operation as described herein may not require all TRPs within a wireless communications system to transmit data. Also, such cases may allow a UE 115 to initiate a request for multi-TRP operation to manage interference if necessary (e.g., when backhaul links between TRPs 205 features increased latency).

Figure 3:
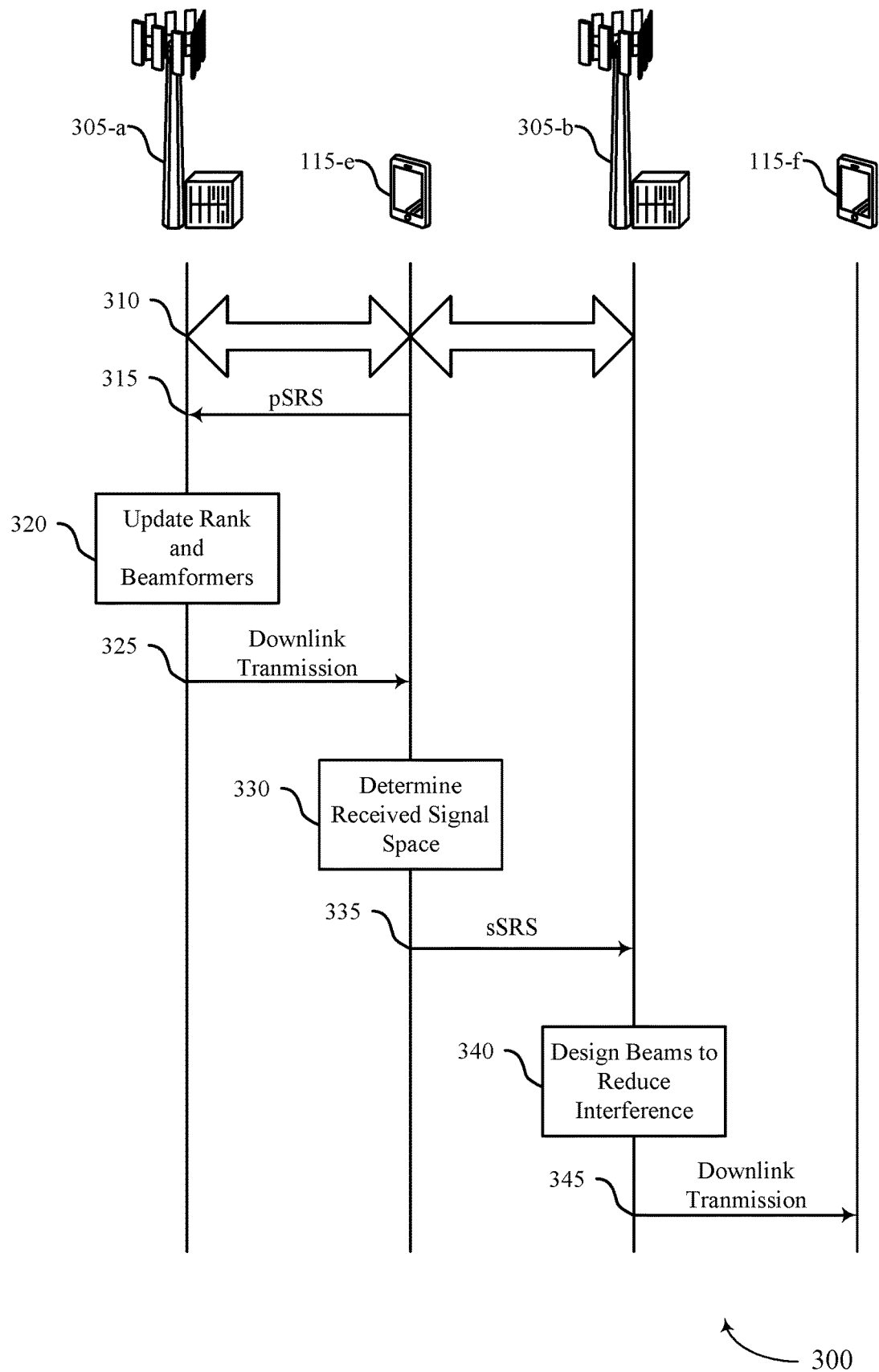
FIG. 3 illustrates an example of a process flow that supports paired SRS transmissions in multi-TRP operation in accordance with aspects of the present disclosure.

FIG. 3 illustrates an example of a process flow 300 that supports paired SRS transmissions in multi-TRP operation in accordance with aspects of the present disclosure. In some examples, process flow 300 may implement aspects of wireless communications systems 100 and 200. Process flow 300 includes TRPs 305-*a* and 305-*b* as well as UEs 115-*e* and 115-*f*, which may be examples of UEs 115 and TRPs 205 described in FIGS. 1 and 2. TRP 305-*a* may be the serving TRP 305 for UE 115-*e*, and TRP 305-*b* may be a neighboring TRP 305 for UE 115-*e*. TRP 305-*b* may be the serving TRP 305 for UE 115-*f*. Process flow 300 may describe MTIC operation wherein UE 115-*e* is associated with TRP 305-*a* (e.g., the serving cell of UE 115-*e*) and receives significant interference from TRP 305-*b* (e.g., a neighboring cell of UE 115-*e*). In such a case, UE 115-*e* may transmit pSRS and sSRS transmissions that are coupled to convey the received signal space of a UE 115 to neighboring TRPs 305, which may mitigate the interference at the received signal space of the UE 115 and improve throughput and reliability of downlink transmissions from TRP 305-*a*.

At 310, UE 115-*e* may establish a communication connection with TRP 305-*a* and TRP 305-*b*. At 315, UE 115-*e* may transmit a pSRS to TRP 305-*a*. As described in FIG. 2, UE 115-*e* may include multiple antenna ports where each antenna corresponds to a spatial dimension in the available signal space of UE 115-*e*. In some cases, UE 115-*e* may use up to each available antenna to transmit the pSRS. For example, UE 115-*e* may include four antenna ports, and UE 115-*e* may use each of the four antenna port to transmit the pSRS to TRP 305-*a*.

At 320, TRP 305-*a* may update its rank and beamformers for downlink transmission. In some cases, TRP 305-*a* may update its rank and beamformers based on the pSRS received from UE 115-*e*. For example, when UE 115-*e* transmits the pSRS using all four of UE 115's antenna ports, TRP 305-*a* may receive the pSRS at multiple antenna ports of TRP 305-*a*. In some cases, energy detection at the multiple antenna ports of TRP 305-*a* may be different such that TRP 305-*a* determines a subset of the antenna ports available to TRP 305-*a* to transmit downlink transmissions. For example, TRP 305-*a* may determine that two of the antenna ports available to TRP 305-*a* correspond to the highest received signal power of the pSRS transmission, which may result in TRP 305-*a* determining that the spatial dimensions associated with the two antenna ports correspond to the best spatial dimensions for downlink transmissions (e.g., the spatial dimensions associated with the least amount of interference). Accordingly, TRP 305-*a* may precode beamformed downlink transmissions to use the two antenna ports during downlink transmission to UE 115-*e*. At 325, TRP 305-*a* may transmit downlink transmissions to UE 115-*e* according to this updated rank (e.g., the number of antenna ports used to transmit downlink transmissions) and beamforming.

At 330, UE 115-*e* may receive the downlink transmission from TRP 305-*a* and determine the received signal space of UE 115-*e*. For example, because TRP 305-*a* transmits downlink transmissions on two antenna ports (e.g., along two spatial dimensions), UE 115-*e* may determine that the received signal strength at two of UE 115-*e*'s four available antenna ports is greater than the received signal strength at the other two of the four available antenna ports. UE 115-*e* may determine that the spatial dimensions corresponding to the two antenna ports associated with the greater received signal strength comprise the received signal space of UE 115-*e*. In some examples, UE 115-*e* may determine that the received signal strength at the other two antenna ports is less than a threshold such that spatial dimensions corresponding to the other two antenna ports are not considered to be within the received signal space, for example. Because TRP 305-*a* may be the serving TRP 305 for UE 115-*e*, UE 115-*e* may want to mitigate interference from other TRPs 305 within the determined received signal space (e.g., along the two spatial dimensions corresponding to the greatest received signal strength of the downlink transmission from TRP 305-*a*).

At 335, UE 115-*e* may transmit an sSRS to TRP 305-*b*. In some examples, UE 115-*e* may precode and transmit the sSRS on at least a subset of the antenna ports of UE 115-*e*. For example, UE 115-*e* may precode the sSRS such that the sSRS is transmitted along one or more of the spatial dimensions that correspond to the received signal space of UE 115-*e*. In such a case, UE 115-*e* may indicate (e.g., convey) the received signal space to TRP 305-*b*. Such a precoding configuration may be different than techniques of whitening an SRS transmission, as UE 115-*e* indicates the received signal space of UE 115-*e* to TRP 305-*b* through the sSRS. In some examples, UE 115-*e* may precode the sSRS such that the sSRS is transmitted along one or more of the spatial dimensions that do not correspond to the received signal space of UE 115-*e*. In some cases, UE 115-*e* may transmit sSRS on resource blocks on which downlink shared channel transmissions (e.g., physical downlink shared channel (PDSCH) transmissions) from TRP 305-*a* are received. In such a case, frequency hopping may be unnecessary. In some examples, since pSRS follow reception of a downlink transmission, sSRS may be limited to resource blocks in which the downlink transmission (e.g., PDSCH transmission) is received. In some cases, UE 115-*e* may precode the sSRS transmission on a smaller set of antenna ports (e.g., on two antenna ports) than the pSRS transmission (e.g., which may be precoded on four antenna ports). For example, if pSRS is scheduled for four antenna ports, and a downlink transmission (e.g., PDSCH transmission) is rank 2, the UE 115-*e* may transmit the sSRS via two antenna ports.

At 340, TRP 305-*b* may receive the sSRS from UE 115-*e* and design downlink transmissions from TRP 305-*b* to reduce interference at the received signal space of UE 115-*e*. Because UE 115-*e* may transmit the sSRS on the subset of antenna ports corresponding the received signal space of UE 115-*e*, TRP 305-*b* may determine to schedule downlink transmissions from TRP 305-*b* using beams that do not have strong dimensional components that correspond to the dimensional components of the received signal space of UE 115-*e*. For example, when UE 115-*e* determines that the received signal space of UE 115-*e* includes the XY plane (e.g., which may correspond to the two antenna ports associated with the greatest received signal strength of the downlink transmission from TRP 305-*a*) and transmits the sSRS to TRP 305-*b* such that the sSRS transmission has strong XY-dimension components, TRP 305-*b* may determine to transmit downlink transmissions to other UEs 115 using beams that do not include strong XY-dimension components. It should be understood that while TRP 305-*b* may determine rank and precoding configurations that reduce interference at the received signal space of UE 115-*e*, the determined rank and precoding configurations may result in downlink transmissions that have dimensional components that at least partially correspond to the received signal space of UE 115-*e*.

At 345, TRP 305-*b* may transmit a downlink transmission to UE 115-*f* in a manner that reduces interference at the received signal space of UE 115-*e*. In the example described above, TRP 305-*b* may transmit the downlink transmission to UE 115-*f* using beams that include reduced XY-dimension components, which may reduce the interference from TRP 305-*b* at the received signal space of UE 115-*e*.

Figure 4:
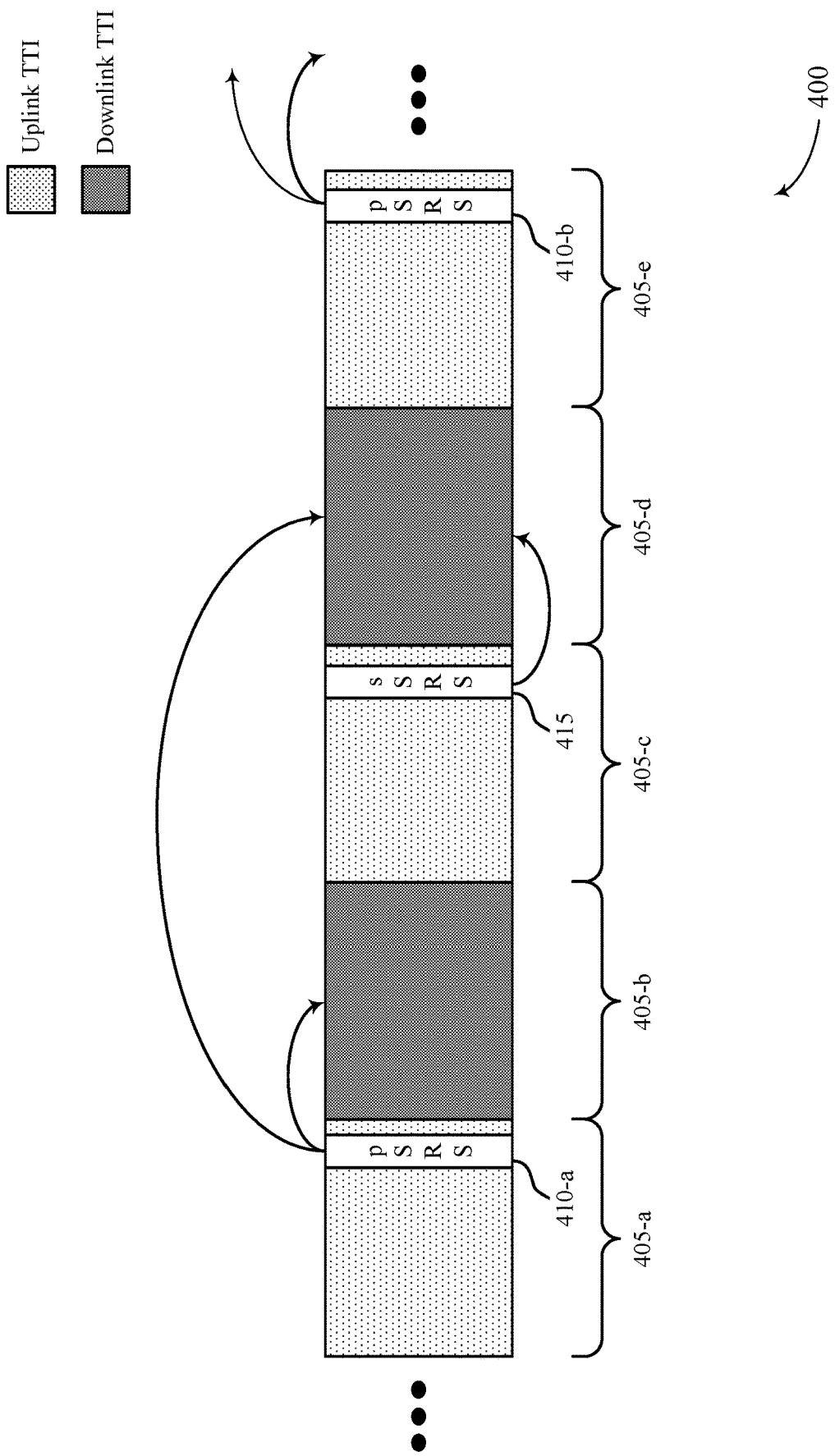
FIG. 4 illustrates an example of a transmission time interval (TTI) configuration that supports paired SRS transmissions in multi-TRP operation in accordance with aspects of the present disclosure.

FIG. 4 illustrates an example of a TTI configuration 400 that supports paired SRS transmissions in multi-TRP operation in accordance with aspects of the present disclosure. In some examples, TTI configuration 400 may implement aspects of wireless communications systems 100 and 200. TTI configuration 400 may include multiple TTIs 405. A TTI 405 may be a duration over which uplink or downlink transmissions may occur. In some cases, a TTI 405 may be a slot, a mini-slot, or a symbol (e.g., or multiple slots, multiple mini-slots, or multiple symbols). For example, TTIs 405 corresponding to uplink transmission (e.g., TTIs 405-*a*, 405-*c*, and 405-*e*) may have the duration of a slot, while TTIs 405 corresponding to downlink transmissions (e.g., TTIs 405-*b* and 405-*d*) may have the duration of threes slots. TTI configuration 400 may be a timeline of the processes described in FIG. 3, and may describe how sSRSs may be used for interference mitigation during MTIC operation.

TTI 405-*a* may be used for uplink transmission from a first UE 115 to a first TRP. The first TRP may be the serving TRP of the UE 115. In some cases, TTI 405-*a* may have a duration of one slot (e.g., slot k). During TTI 405-*a*, the first UE 115 may transmit pSRS 410-*a* to the first TRP. As described in FIG. 3, pSRS 410-*a* may aid the first TRP in determining the wireless channel between the first UE 115 and the first TRP, and the first TRP may determine a beamforming configuration based on the determined wireless channel between the first UE 115 and the first TRP.

TTI 405-*b* may be used for downlink transmission from the first TRP to the first UE 115. In some cases, TTI 405-*a* may have a duration of three slots (e.g., slot k+1, k+2, and k+3). The first TRP may transmit downlink transmissions to the first UE 115 based on the determined wireless channel between the first TRP and the first UE 115. As described in FIG. 3, the downlink transmissions from the first TRP may occupy a received signal space of the UE 115. The UE 115 may want to mitigate interference from other TRPs within this received signal space.

TTI 405-*c* may be used for uplink transmission from the first UE 115 to a second TRP (e.g., a neighboring TRP). In some cases, TTI 405-*c* may have a duration of one slot (e.g., slot k+4). During TTI 405-*a*, the first UE 115 may transmit sSRS 415 to the second TRP. As described in FIG. 3, the first UE 115 may precode the beamformed transmission of sSRS 415 to indicate the received signal space of the first UE 115.

TTI 405-*d* may be used for downlink transmission from the first TRP to the first UE 115, and may be used for downlink transmission from the second TRP to one or more other UEs 115. In some cases, TTI 405-*c* may have a duration of three slots (e.g., slot k+5, k+6, and k+7). As described in FIG. 3, the second TRP may receive sSRS 415 which may indicate the received signal space of the first UE 115. The second TRP may determine to precode beamformed transmissions to one or more other UEs 115 in a manner that reduces or avoids interference in the received signal space of the first UE 115. During TTI 405-*b*, the first TRP may continue transmitting downlink transmissions according to the beamforming and rank configuration determined based on pSRS 410-*a*.

TTI 405-*e* may be used for uplink transmission from the first UE 115 to the first TRP. In some cases, TTI 405-*a* may have a duration of one slot (e.g., slot k+8). During TTI 405-*e*, the first UE 115 may transmit pSRS 410-*b* to the first TRP. As described in FIG. 3, pSRS 410-*b* may aid the first TRP in determining the wireless channel between the first UE 115 and the first TRP, and the first TRP may determine an updated beamforming configuration based on the determined wireless channel between the first UE 115 and the first TRP. In some cases, the first UE 115 may whiten pSRS 410-*b* to reflect a new noise and/or interference profile at the first UE 115.

As described above, pSRSs 410 and sSRSs 415 processes may be woven together such that an sSRS 415 may depend on the pSRS 410 that immediately precedes the sSRS 415. For example, the precoding and beamforming used to transmit an sSRS 415 may be based on the determined received signal space of a UE 115. In some examples, sSRS scheduling that follows pSRS may allow sufficient gap for the UE 115 to determine precoders, and precoding, for sSRS 415. The received signal space of the UE 115 may be based on the spatial dimensions along which downlink transmissions from a serving TRP are sent to a UE 115, where the spatial dimensions may be determined based on the pSRS 410 that immediately precedes the sSRS 415. In some cases, the difference in transmission starting points between a pSRS 410 and an sSRS 415 may be based on the time needed by a UE 115 to determine the precoding used to transmit the sSRS 415. In some cases, the paired mode of operation for pSRSs 410 and sSRSs 415 may capture the dependency of sSRSs 415 on pSRSs 410. This setting may be a new SRS use case, and may determine how certain sSRS 415 parameters are sourced or set.

In some cases, one or both of a first TRP and a second TRP may transmit control signaling (e.g., downlink control information (DCI)) to a UE 115, where the control signaling may indicate a resource set configuration for one or more of a pSRS 410 and an sSRS 415. For example, a UE 115 may receive control signaling (e.g., from one or both of a first TRP and a second TRP) that indicates that a pSRS 410 and/or an sSRS 415 are to be transmitted over a duration of one symbol period. In some cases, a pSRS 410 and/or an sSRS 415 may not be transmitted on every resource element of a configured symbol duration. In some instances, the resource set configuration may indicate at least one parameter (e.g., periodicity and/or duration) that is common to a pSRS 410 and an sSRS 415. For example, a pSRSs 410 and an sSRSs 415 may be configured to be one symbol period in duration, and may be configured to be transmitted once every two uplink TTIs 405 (e.g., or one every four slots). In some cases, the resource set configuration may indicate downlink shared channel (e.g., PDSCH) rank information and/or resource block allocation information, and a UE 115 may limit the transmission of an sSRS 415 based on the downlink shared channel information and/or the resource block allocation information.

It should be understood that TTI configuration 400 may apply to any transmissions ordering of pSRSs 410 and sSRSs 415. For example, a UE 115-*a* may transmit pSRS 410-*a* during TTI 405-*a*, may transmit pSRS 410-*b* during TTI 405-*c*, and may transmit sSRS 415 during TTI 405-*e*. In such a case the UE 115 may precode and transmit sSRS 415 based on pSRS 410-*b*.

Figure 5:
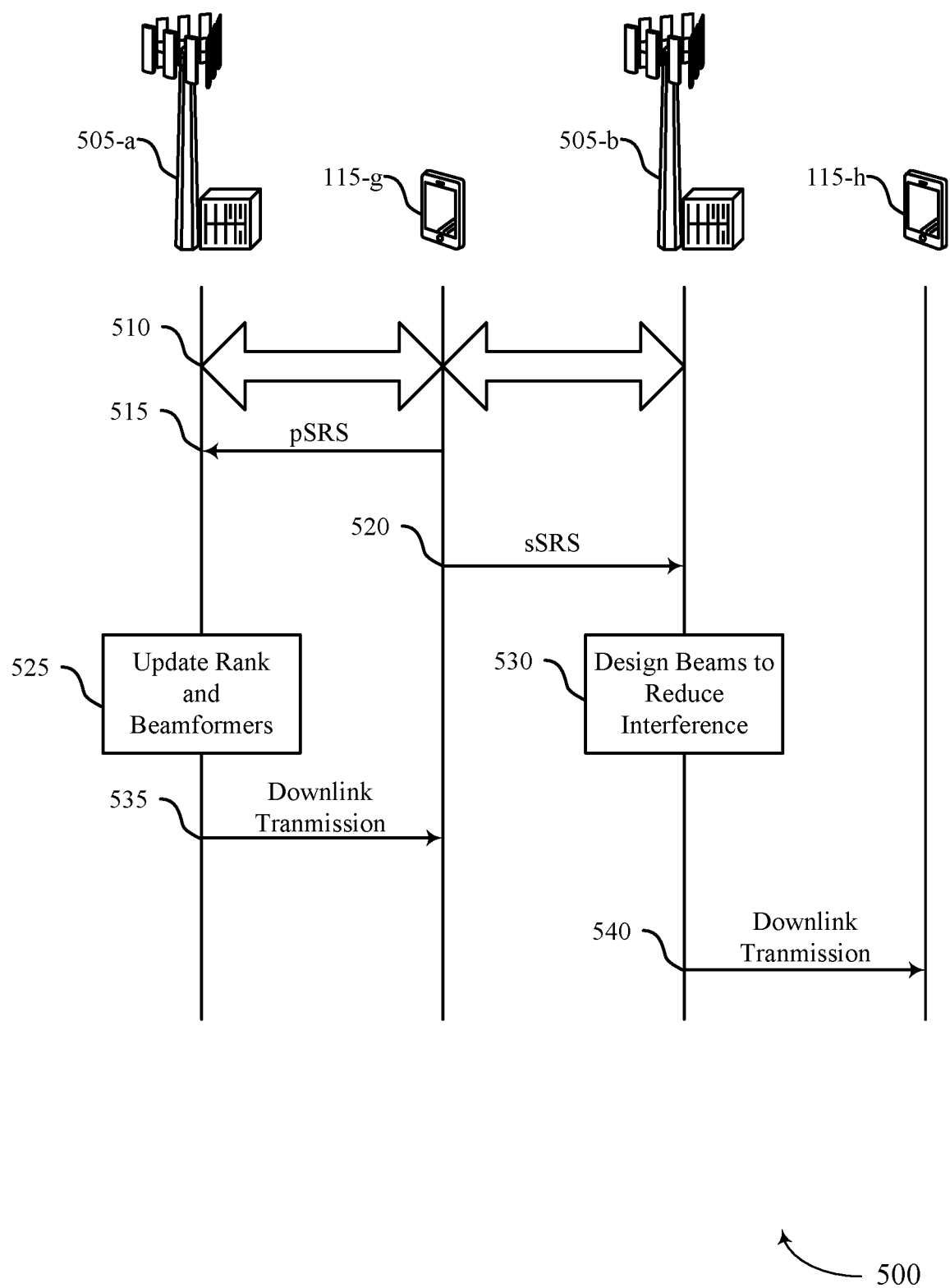
FIGS. 5 and 6 illustrate example of process flows that support paired SRS transmissions in multi-TRP operation in accordance with aspects of the present disclosure.

FIG. 5 illustrates an example of a process flow 500 that supports paired SRS transmissions in multi-TRP operation in accordance with aspects of the present disclosure. In some examples, process flow 500 may implement aspects of wireless communications systems 100 and 200. Process flow 500 includes TRPs 505-*a* and 505-*b* as well as UEs 115-*g* and 115-*h*, which may be examples of UEs 115 and TRPs 205 described in FIGS. 1 and 2. TRP 505-*a* may be the serving TRP 305 for UE 115-*g*, and TRP 505-*b* may be a neighboring TRP 305 for UE 115-*g*. TRP 505-*b* may be the serving TRP 305 for UE 115-*h*. Process flow 500 may describe MTIC operation wherein pSRS and sSRS transmissions are decoupled to convey the received signal space of a UE 115 to neighboring TRPs 305, which may allow for interference mitigation at the received signal space of the UE 115 based on the sSRS.

At 510, UE 115-*g* may establish a communication connection with TRP 505-*a* and TRP 505-*b*. At 515, UE 115-*g* may transmit a pSRS to TRP 505-*a*. As described in FIG. 2, UE 115-*g* may include multiple antenna ports where each antenna corresponds to a spatial dimension in the available signal space of UE 115-*g*. In some cases, UE 115-*g* may use each available antenna to transmit the pSRS. For example, UE 115-*g* may include four antenna ports, and UE 115-*g* may use each of the four antenna ports to transmit the pSRS to TRP 505-*a*.

At 520, UE 115-*g* may transmit an sSRS to TRP 505-*b*. As described in FIG. 2, UE 115-*g* may include multiple antenna ports where each antenna corresponds to a spatial dimension in the signal space of UE 115-*g*. In some cases, UE 115-*g* may use each available antenna to transmit the sSRS. For example, UE 115-*g* may include four antenna ports, and UE 115-*g* may use each of the four antenna ports to transmit the sSRS to TRP 505-*b*. In some cases, UE 115-*g* may independently configure the resource sets used to transmit the pSRS and the sSRS.

At 525, TRP 505-*a* may update its rank and beamformers for downlink transmission. In some cases, TRP 505-*a* may update its rank and beamformers based on the pSRS received from UE 115-*g*. For example, when UE 115-*g* transmits the pSRS using all four of UE 115's antenna ports, TRP 505-*a* may receive the pSRS at multiple antenna ports of TRP 505-*a*. In some cases, energy detection at the multiple antenna ports of TRP 505-*a* may be different such that TRP 505-*a* determines a subset of the antenna ports available to TRP 505-*a* to transmit downlink transmissions. For example, TRP 505-*a* may determine that two of the antenna ports available to TRP 505-*a* correspond to the highest received signal power of the pSRS transmission, which may result in TRP 505-*a* determining that the spatial dimensions associated with the two antenna ports correspond to the best spatial dimensions for downlink transmissions (e.g., the spatial dimensions associated with the least amount of interference). Accordingly, TRP 505-*a* may precode beamformed downlink transmissions to use the two antenna ports during downlink transmission. At 535, TRP 505-*a* may transmit downlink transmissions to UE 115-*g* according to this updated rank (e.g., the number of antenna ports used to transmit downlink transmissions) and beamforming.

At 530, TRP 505-*b* may receive the sSRS from UE 115-*g* and design downlink transmissions from TRP 505-*b* to reduce interference at the received signal space of UE 115-*g*. Because UE 115-*g* may transmit the sSRS using all four of UE 115-*g*'s antenna ports, TRP 505-*b* may receive the sSRS at multiple antenna ports of TRP 505-*b*. In some cases, the received signal power at the multiple antenna ports of TRP 505-*b* may be different such that TRP 505-*b* determines a subset of the antenna ports available to TRP 505-*b* to transmit downlink transmissions to other UEs 115 (e.g., UE 115-*h*). For example, TRP 505-*b* may determine that two of the antenna ports available to TRP 505-*b* correspond to the highest received signal power of the sSRS transmission, which may result in TRP 505-*a* determining that the spatial dimensions associated with the two antenna ports correspond to the preferred spatial dimensions for communications between UE 115-*g* and the serving TRP 505 of UE 115-*g* (e.g., TRP 505-*a*). Accordingly, TRP 505-*b* may precode beamformed downlink transmissions to use different antenna ports (e.g., antenna ports that do not correspond to the preferred spatial dimensions for communication between UE 115-*g* and TRP 505-*a*) during downlink transmissions to other UEs 115 so as to avoid interference at the received signal space of UE 115-*g*. At 540, TRP 505-*b* may transmit downlink transmissions to UE 115-*h* according to this updated rank and beamforming.

The techniques described by process flow 500 may describe how pSRS and sSRS may be configured in two independent processes. For example, a UE 115 may use sSRS opportunistically when interference mitigation is desired. In such a case, the UE 115 may transmit sSRS to neighboring TRPs 505 aperiodically when interference mitigation is desired. In some cases, pSRSs and sSRSs may be transmitted as a single broadcast SRS (e.g., when a timing advance difference between a pSRS and an sSRS is within a timing threshold and/or when the transmit power difference between a pSRS and an sSRS is within a power threshold). In other cases, a pSRS and an sSRS may be transmitted on different signals, which may be based on timing advance and transmit power differences between a pSRS and an sSRS. In some instances, the SRS resource sets used to transmit a pSRS and an sSRS may be independently configured (e.g., by one or more TRPs 505).

Figure 6:
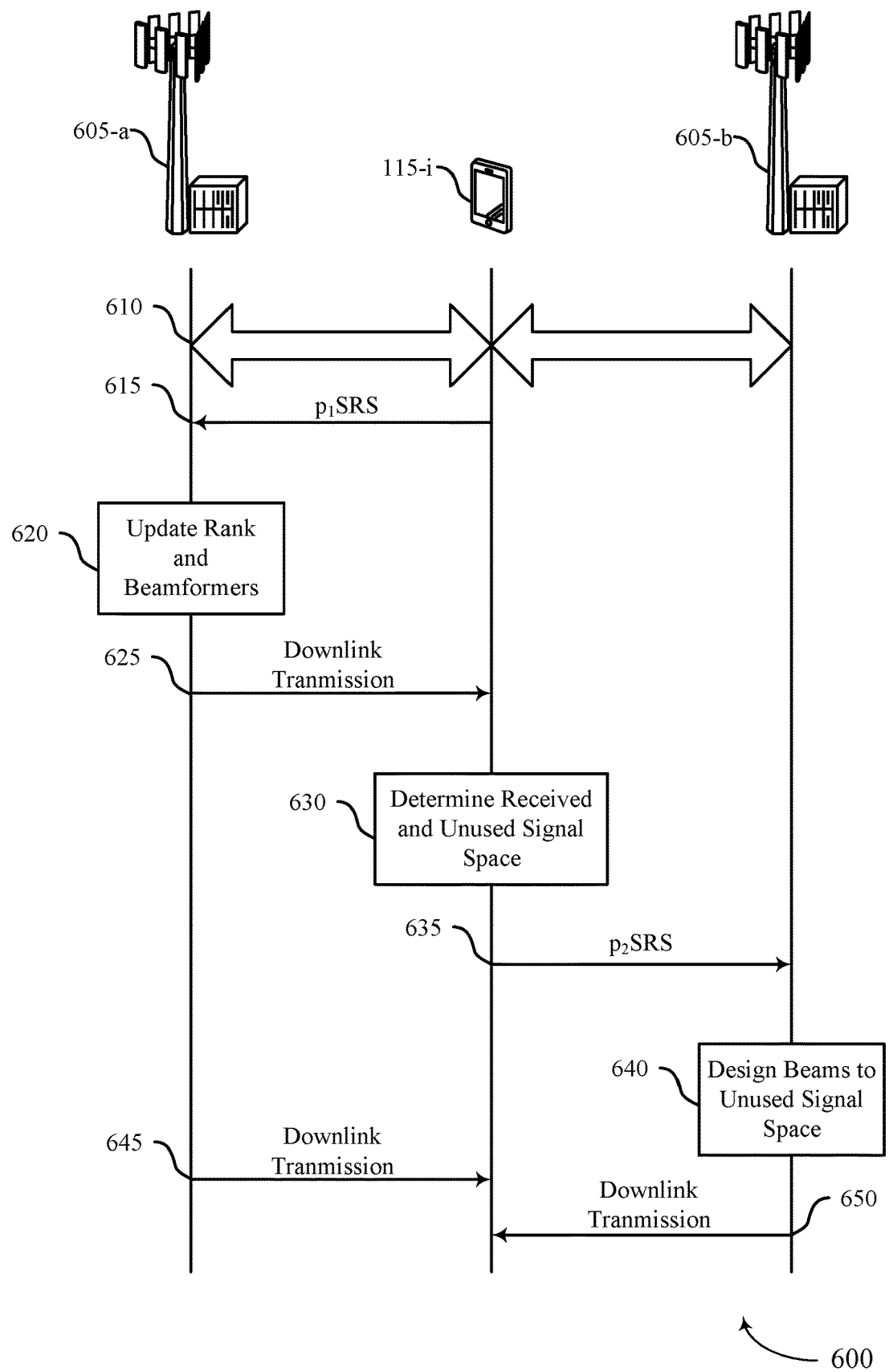

FIG. 6 illustrates an example of a process flow 600 that supports paired SRS transmissions in multi-TRP operation in accordance with aspects of the present disclosure. In some examples, process flow 600 may implement aspects of wireless communications systems 100 and 200. Process flow 600 includes TRPs 605-*a* and 605-*b* as well as UE 115-*i*, which may be examples of a UE 115 and TRPs 205 described in FIGS. 1 and 2. TRP 605-*a* and TRP 605-*b* may be serving TRPs 605 associated with UE 115-*i*. Process flow 600 may describe NCJT operation wherein UE 115-*i* receives two different data streams respectively from TRP 605-*a* and TRP 605-*b*. The data streams may be spatially multiplexed such that they are jointly scheduled in time and frequency. In such a case, UE 115-*i* may decode the two data streams due to TRP 605-*a* and TRP 605-*b* coordinating such that the two data streams are separated within the available signal space of UE 115-*i*. Thus, TRP 605-*a* and TRP 605-*b* may seek to ensure that there is limited spatial overlap between the two data streams within the available signal space of UE 115-*i*.

In some cases, TRP 605-*a* and TRP 605-*b* may coordinate via a backhaul link to ensure that the two data streams have limited overlap within the received signal space of UE 115-*i* so that the two data streams are decodable at UE 115-*i*. However, as described above, in some cases the backhaul links between TRP 605-*a* and TRP 605-*a* may feature increased latency such that coordination between the TRPs 605 is limited. In such a case, UE 115-*i* may transmit multiple paired pSRS (e.g., $p_1$SRS and $p_2$SRS) to TRP 605-*a* and TRP 605-*b* to ensure the separation of the two data streams transmitted by the TRPs 605, which may mitigate the interference at the received signal space of the UE 115 and allow efficient NCJT operation.

At 610, UE 115-*i* may establish a communication connection with TRP 605-*a* and TRP 605-*b*. At 615, UE 115-*i* may transmit a $p_1$SRS to TRP 605-*a*. As described in FIG. 2, UE 115-*i* may include multiple antenna ports where each antenna corresponds to a spatial dimension in the available signal space of UE 115-*i*. In some cases, UE 115-*i* may use each available antenna to transmit the $p_1$SRS. For example, UE 115-*i* may include four antenna ports, and UE 115-*i* may use each of the four antenna ports to transmit the $p_1$SRS to TRP 605-*a*.

At 620, TRP 605-*a* may update its rank and beamformers for downlink transmission. In some cases, TRP 605-*a* may update its rank and beamformers based on the $p_1$SRS received from UE 115-*i*. For example, when UE 115-*i* transmits the $p_1$SRS using all four of UE 115's antenna ports, TRP 605-*a* may receive the $p_1$SRS at multiple antenna ports of TRP 605-*a*. In some cases, energy detected at the multiple antenna ports of TRP 605-*a* may be different such that TRP 605-*a* determines a subset of the antenna ports available to TRP 605-*a* to transmit downlink transmissions. For example, TRP 605-*a* may determine that two of the antenna ports available to TRP 605-*a* correspond to the highest received signal power of the $p_1$SRS transmission, which may result in TRP 605-*a* determining that the spatial dimensions associated with the two antenna ports correspond to the best spatial dimensions for downlink transmissions (e.g., the spatial dimensions associated with the least amount of interference). Accordingly, TRP 605-*a* may precode beamformed downlink transmissions to use the two antenna ports during downlink transmission to UE 115-*i*. At 625, TRP 605-*a* may transmit downlink transmissions to UE 115-*i* according to this updated rank (e.g., the number of antenna ports used to transmit downlink transmissions) and beamforming.

At 630, UE 115-*i* may receive the downlink transmission from TRP 605-*a* and determine the received signal space of UE 115-*i*. For example, because TRP 605-*a* transmits downlink transmissions on two spatial dimensions, UE 115-*i* may determine that the received signal strength at two of UE 115-*i*'s four available antenna ports is greater than the received signal strength at the other two of the four available antenna ports. In some examples, UE 115-*i* may determine that the spatial dimensions corresponding to the two antenna ports associated with the greater received signal strength comprise the received signal space. In some examples, UE 115-*i* may determine that the received signal strength at the other two antenna ports is less than a threshold such that spatial dimensions corresponding to the other two antenna ports are not considered to be within the received signal space, for example. Because TRP 605-*a* may be the serving TRP 305 for UE 115-*i*, UE 115-*i* may want to mitigate interference from other TRPs 305 within the determined received signal space (e.g., along the two spatial dimensions corresponding to the greatest received signal strength of the downlink transmission from TRP 605-*a*).

At 635, UE 115-*i* may transmit a $p_2$SRS to TRP 605-*b*. In some examples, UE 115-*i* may precode and transmit the $p_2$SRS on at least a subset of the antenna ports available to UE 115-*i*. For example, UE 115-*i* may precode the $p_2$SRS such that the $p_2$SRS is transmitted along one or more of the spatial dimensions that correspond to the received signal space of UE 115-*i*. In some examples, UE 115-*i* may precode the $p_2$SRS such that the $p_2$SRS is transmitted along one or more of the spatial dimensions that correspond to the unused signal space of UE 115-*i*. In such cases, UE 115-*i* may indicate (e.g., convey) the unused signal space to TRP 605-*b*. Such a precoding configuration may be similar to whitened SRS transmission, such that downlink transmissions from TRP 605-*a* may be treated as interference while whitening the transmission of $p_2$SRS. In some cases, UE 115-*i* may precode the $p_2$SRS transmission on a smaller set of antenna ports (e.g., on two antenna ports) than the $p_1$SRS transmission (e.g., which may be precoded on four antenna ports). For example, if $p_1$SRS is scheduled for four antenna ports, and the downlink transmission 625 from TRP 605-1 is rank 2, then $p_2$SRS may be transmitted via two antenna ports (e.g., restricted to 2 ports) to signal the two unused spatial dimensions.

At 640, TRP 605-*b* may receive the $p_2$SRS from UE 115-*i* and design downlink transmissions from TRP 605-*b* to reduce interference at the received signal space of UE 115-*i*. Because UE 115-*i* may transmit the $p_2$SRS on the subset of antenna ports corresponding the unused signal space of UE 115-*i*, TRP 605-*b* may determine to schedule downlink transmissions along the spatial dimensions of the unused signal space of UE 115-*i*. For example, when UE 115-*i* determines that the received signal space of UE 115-*i* includes the XY plane (e.g., which may correspond to the two antenna ports associated with the greatest received signal strength of the downlink transmission from TRP 605-*a*) and transmits the $p_2$SRS to TRP 605-*b* such that the $p_2$SRS transmission does not have strong XY-dimension components, TRP 605-*b* may determine to transmit downlink transmissions to UE 115-*i* using beams that do not have strong XY-dimension components. It should be understood that while TRP 605-*b* may determine rank and precoding configurations that reduce interference at the received signal space of UE 115-*i*, the determined rank and precoding configurations may result in downlink transmissions that have components that at least partially correspond to the received signal space of UE 115-*i*.

At 645, TRP 605-*a* may transmit downlink transmissions to UE 115-*i* according to the rank and beamforming based on $p_1$SRS.

At 650, TRP 605-*b* may transmit a downlink transmission to UE 115-*i* in a manner that reduces interference at the received signal space of UE 115-*i*. In the example described above, TRP 605-*b* may transmit the downlink transmission to UE 115-*i* using beams that include reduced XY-dimension components, which may reduce the interference from TRP 605-*b* at the received signal space of UE 115-*i*.

In some cases, UE 115-*i* may assume an implicit ordering of transmissions from TRP 605-*a* and TRP 605-*b* based on a certain priority metric. For example, TRP 605-*a* may have a higher priority than TRP 605-*b* such that TRP 605-*a* transmits downlink transmissions to UE 115-*i* before TRP 605-*b* transmits downlink transmissions to UE 115-*i*.

Figure 7:
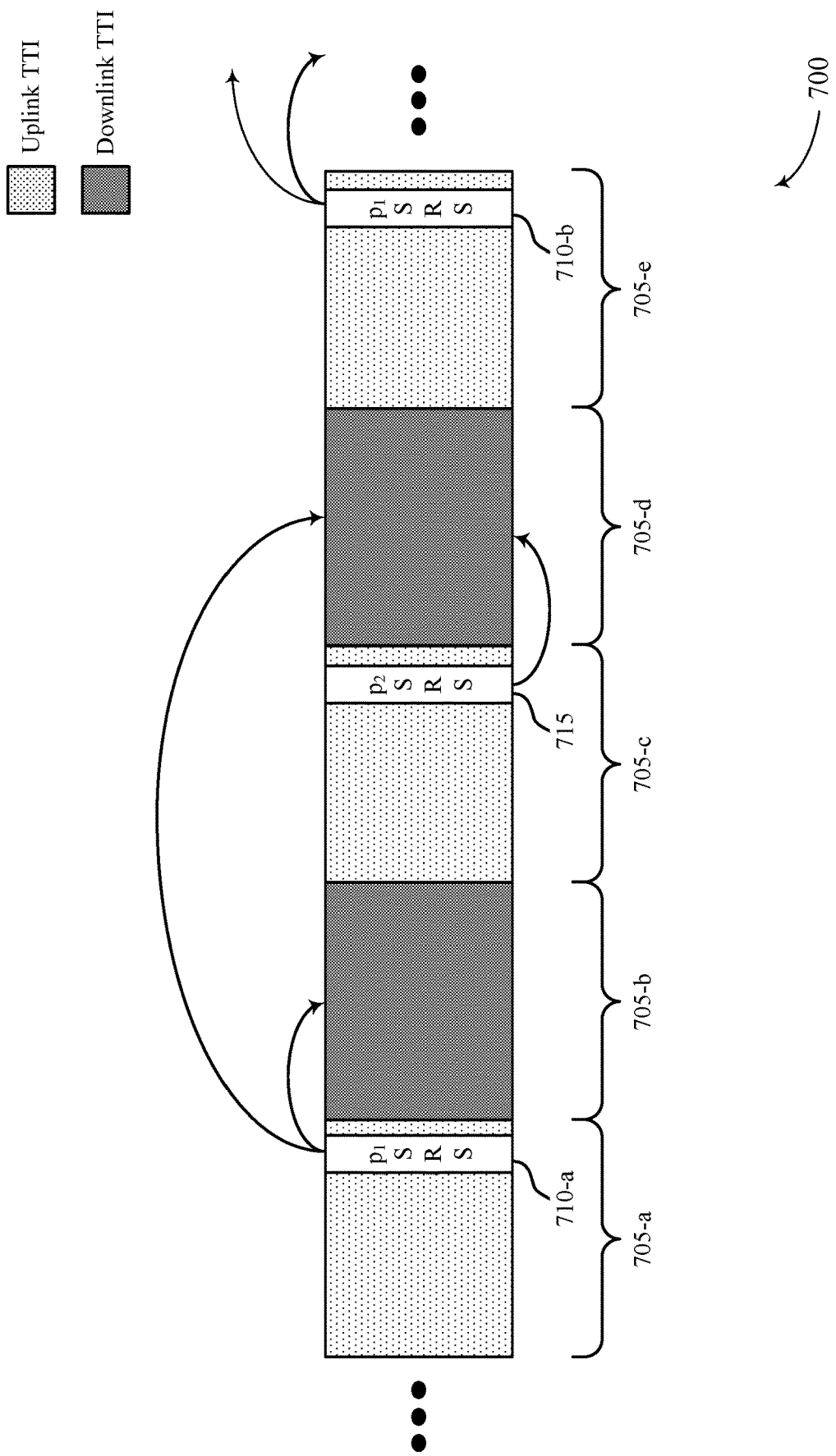
FIG. 7 illustrates an example of a TTI configuration that supports paired SRS transmissions in multi-TRP operation in accordance with aspects of the present disclosure.

FIG. 7 illustrates an example of a TTI configuration 700 that supports paired SRS transmissions in multi-TRP operation in accordance with aspects of the present disclosure. In some examples, TTI configuration 700 may implement aspects of wireless communication systems 100 and 200. TTI configuration 700 may include multiple TTIs 705. A TTI 705 may be a duration over which uplink or downlink transmissions may occur. In some cases, a TTI 705 may be a slot, a mini-slot, or a symbol (e.g., or multiple slots, multiple mini-slots, or multiple symbols). For example, TTIs 705 corresponding to uplink transmission (e.g., TTIs 705-*a*, 705-*c*, and 705-*e*) may have the duration of a slot, while TTIs 705 corresponding to downlink transmissions (e.g., TTIs 705-*b* and 705-*d*) may have the duration of threes slots. TTI configuration 700 may be a timeline of the processes described in FIG. 6, and may describe how different pSRSs (e.g., $p_1$SRS and $p_2$SRS) may be used for interference mitigation during NCJT operation.

TTI 705-*a* may be used for uplink transmission from a UE 115 to a first TRP. The first TRP may be the serving TRP of the UE 115. In some cases, TTI 705-*a* may have a duration of one slot (e.g., slot k). During TTI 705-*a*, the UE 115 may transmit $p_1$SRS 710-*a* to the first TRP. As described in FIG. 3, $p_1$SRS 710-*a* may aid the first TRP in determining the spatial dimensions of received signal space at the UE 115, and the first TRP may determine a beamforming configuration based on the determined spatial dimensions.

TTI 705-*b* may be used for downlink transmission from the first TRP to the UE 115. In some cases, TTI 705-*a* may have a duration of three slots (e.g., slot k+1, k+2, and k+3). The first TRP may transmit downlink transmissions to the UE 115 based on the determined wireless channel between the first TRP and the UE 115. As described in FIG. 6, the downlink transmissions from the first TRP may occupy a received signal space of the UE 115. The UE 115 may want to mitigate interference from other TRPs within this received signal space.

TTI 705-*c* may be used for uplink transmission from the UE 115 to the second TRP. In some cases, TTI 705-*c* may have a duration of one slot (e.g., slot k+4). During TTI 705-*a*, the UE 115 may transmit $p_2$SRS 715 to the second TRP. As described in FIG. 6, the UE 115 may precode the beamformed transmission of $p_2$SRS 715 to indicate the unused signal space of the UE 115 to the second TRP.

TTI 705-*d* may be used for downlink transmission from the first TRP to the UE 115, and may be used for downlink transmission from the second TRP to the UE 115. In some cases, TTI 705-*c* may have a duration of three slots (e.g., slot k+5, k+6, and k+7). As described in FIG. 3, the second TRP may receive $p_2$SRS 715 which may indicate the unused signal space of the UE 115. The second TRP may determine to precode beamformed transmissions the UE 115 in a manner that reduces or avoids interference in the received signal space of the UE 115 by steering downlink transmissions towards the unused signal space. During TTI 705-*b*, the first TRP may continue transmitting downlink transmissions according to the beamforming and rank configuration determined based on $p_1$SRS 710-*a*.

TTI 705-*e* may be used for uplink transmission from the UE 115 to the first TRP. In some cases, TTI 705-*a* may have a duration of one slot (e.g., slot k+8). During TTI 705-*e*, the UE 115 may transmit $p_1$SRS 710-*b* to the first TRP. As described in FIG. 3, $p_1$SRS 710-*b* may aid the first TRP in determining the wireless channel between the UE 115 and the first TRP, and the first TRP may determine an update beamforming configuration based on the determined wireless channel between the UE 115 and the first TRP.

As described above, $p_1$SRS 710 and $p_2$SRS 715 may be interdependent such that a $p_2$SRS 715 may depend on the $p_1$SRS 710 that immediately precedes the $p_2$SRS 715. For example, the precoding and beamforming used to transmit a $p_2$SRS 715 may be based on the determined received signal space of a UE 115, and the received signal space of the UE 115 may be based on the spatial dimensions along which downlink transmissions from a serving TRP are set to a UE 115, where the spatial dimensions may be determined based on the $p_1$SRS 710 that immediately precedes the $p_2$SRS 715. Thus, when downlink precoding and/or rank changes from a first TRP, UE 115 may adapt $p_2$SRS 715 accordingly to indicate the unused signal space. In some cases, the difference in transmission starting points between a $p_1$SRS 710 and a $p_2$SRS 715 may be based on the time needed by a UE 115 to determine the precoding used to transmit the $p_2$SRS 715. In some cases, the paired mode (e.g., ordered mode) of operation for $p_1$SRSs 710 and $p_2$SRSs 715 may capture the dependencies of a $p_2$SRS 715 on a $p_1$SRS 710. This paired mode may be a new SRS use case, and may determine how certain $p_2$SRS 715 parameters are sourced or set.

In some cases, one or more of a first TRP and a second TRP may transmit control signaling (e.g., DCI) to a UE 115, where the control signaling may indicate a resource set configuration for one or more of a $p_1$SRS 710 and a $p_2$SRS 715. For example, a UE 115 may receive control signaling (e.g., from one or both of a first TRP and a second TRP) that indicates that a $p_1$SRS 710 and/or a $p_2$SRS 715 are to be transmitted over a duration of one symbol period. In some cases, a $p_1$SRS 710 and/or a $p_2$SRS 715 may not be transmitted on every resource element of a configured symbol duration. In some instances, the resource set configuration may indicate at least one parameter (e.g., periodicity and/or duration) that is common to a $p_1$SRS 710 and a $p_2$SRS 715. For example, a $p_1$SRS 710 and a $p_2$SRS 715 may be configured to be one symbol period in duration, and may be configured to be transmitted once every two uplink TTIs 705 (e.g., or one every four slots). In some cases, the resource set configuration may indicate downlink shared channel (e.g., PDSCH) rank information and/or resource block allocation information. In some examples, the resource block allocation from a first TRP may not entirely overlap with the resource block allocation from a second TRP. In some examples, the first TRP may have PDSCH rank information and/or RB allocation of its own downlink transmission that may be the same or differ from the first TRP.

In some cases, a UE 115 may assume an implicit ordering for SRS based on a priority metric. For example, $p_1$SRS 710 may have a higher priority than $p_2$SRS 715 such that the UE 115 transmits $p_1$SRS 710 to a first TRP before transmitting $p_2$SRS 715 to a second TRP. In some cases, a UE 115 may assume an implicit ordering for SRS based on a service type. For example, $p_1$SRS 710 may have a different service type than $p_2$SRS 715 such that the UE 115 transmits $p_1$SRS to a first TRP before transmitting $p_2$SRS 715 to a second TRP. In some cases, a first TRP and a second TRP may determine which TRP receives $p_1$SRS 710 and $p_2$SRS 715 based on a priority metric and/or a service type. This ordering information may be transmitted by one or more TRPs to a UE 115 within a resource set configuration (e.g., within DCI).

It should be understood that TTI configuration 700 may apply to any transmission ordering of $p_1$SRSs 710 and $p_2$SRSs 715. For example, a UE 115-a may transmit $p_1$SRS 710-a during TTI 705-a, may transmit $p_1$SRS 710-b TTI 705-c, and may transmit $p_2$SRS 715 during TTI 705-e. In such a case the UE 115 may precode and transmit $p_2$SRS 715 based on $p_1$SRS 710-b.

Figure 8:
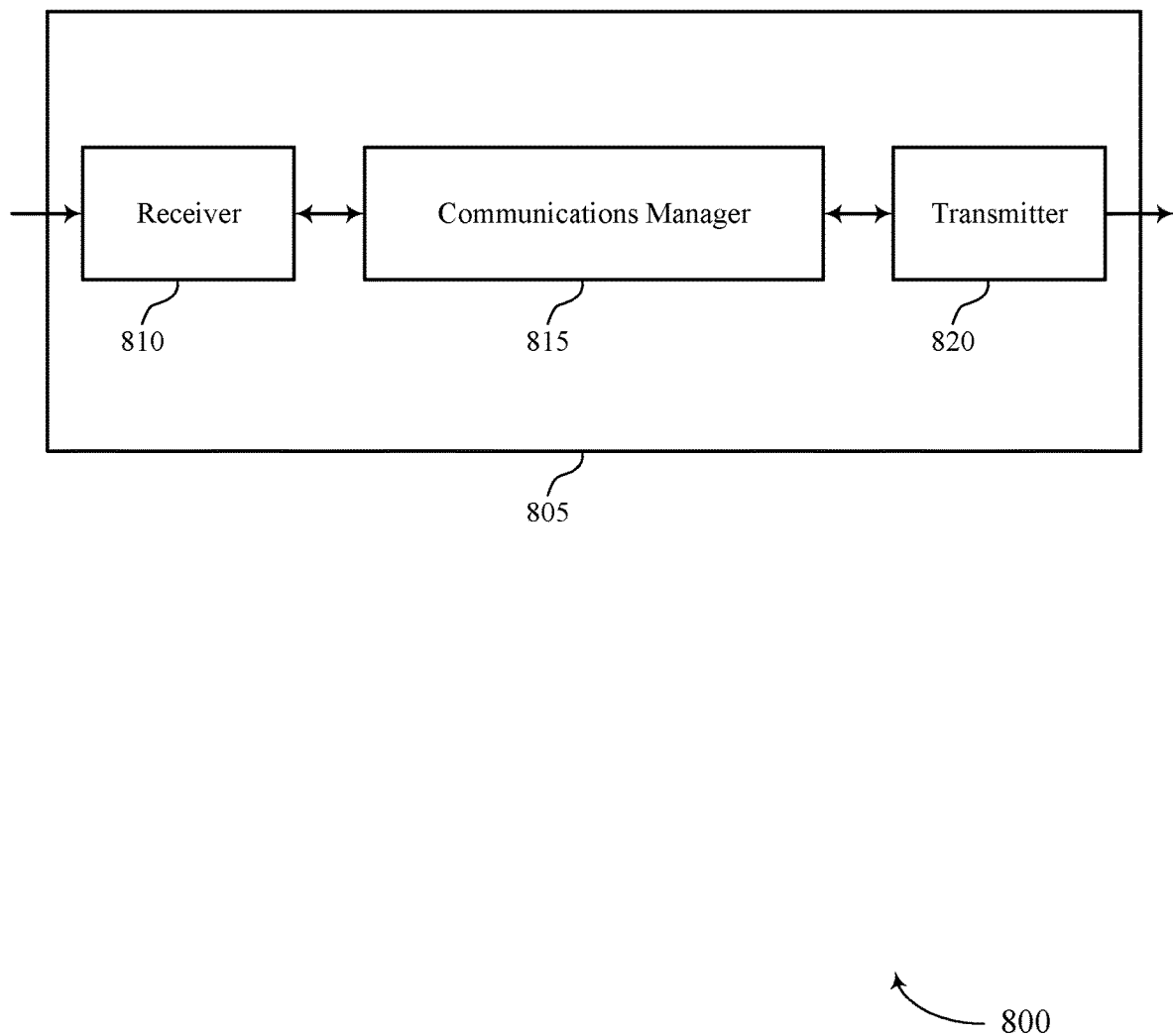
FIGS. 8 and 9 show block diagrams of devices that support paired SRS transmissions in multi-TRP operation in accordance with aspects of the present disclosure.

FIG. 8 shows a block diagram 800 of a device 805 that supports paired SRS transmissions in multi-TRP operation in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to paired SRS transmissions in multi-TRP operation). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit a first SRS to a first TRP, transmit, to a second TRP, a second SRS that is precoded to indicate at least one dimension of a received signal space corresponding to the downlink transmission, and receive, from the first TRP, a downlink transmission that is based on the first SRS. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, communications manager 815 may be implemented as an integrated circuit or chipset for a mobile device modem, and the receiver 810 and transmitter 820 may be implemented as analog components (e.g., amplifiers, filters, antennas, etc.) coupled with the mobile device modem to enable wireless transmission and reception.

The communications manager 815 as described herein may be implemented to realize one or more potential advantages. Various implementations may enable mitigation of interference (e.g., interference caused by one or more neighboring TRPs) along a received signal space of device 805 that the comprises communications manager 815. At least one implementation may enable the communications manager 815 to effectively decode transmission from multiple serving TRPs. At least one implementation may enable communications manager 815 to increase the throughput to device 805 by allowing for higher rank transmission (e.g., the use of multiple antenna ports to transmit and receive communications).

Based on implementing the interference mitigation techniques as described herein, one or more processors of the device 805 (e.g., processor(s) controlling or incorporated with one or more of receiver 810, communications manager 815, and transmitter 820) may reduce an amount of time required to effectively decode data streams transmitted from multiple serving TRPs.

Figure 9:
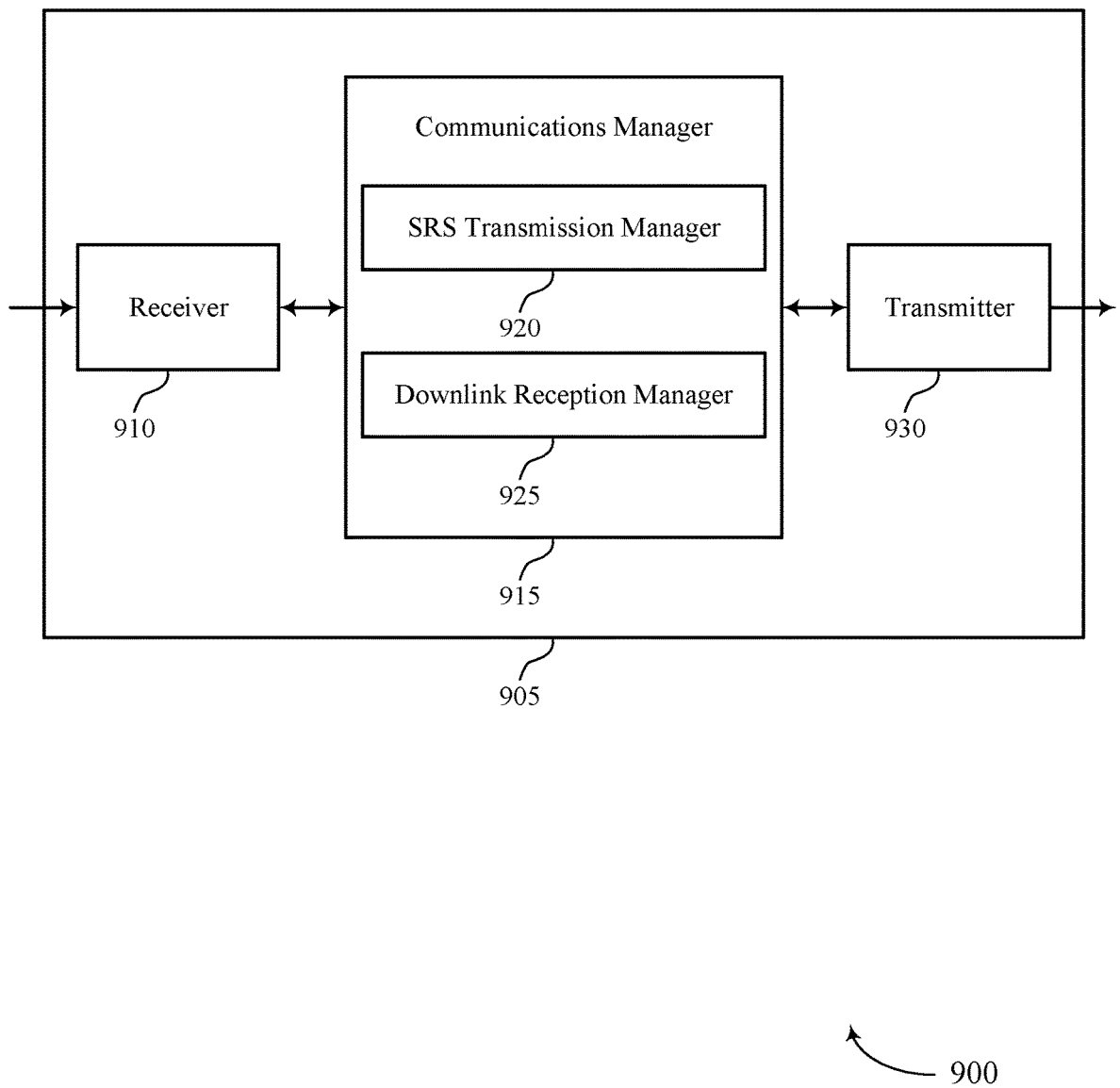

FIG. 9 shows a block diagram 900 of a device 905 that supports paired SRS transmissions in multi-TRP operation in accordance with aspects of the present disclosure. The device 905 may be an example of aspects of a device 805 or a UE 115 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to paired SRS transmissions in multi-TRP operation). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an SRS transmission manager 920 and a downlink reception manager 925. The communications manager 915 may be an example of aspects of the communications manager 1110 described herein.

The SRS transmission manager 920 may transmit a first SRS to a first TRP and transmit, to a second TRP, a second SRS that is precoded to indicate at least one dimension of a received signal space corresponding to the downlink transmission.

The downlink reception manager 925 may receive, from the first TRP, a downlink transmission that is based on the first SRS.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
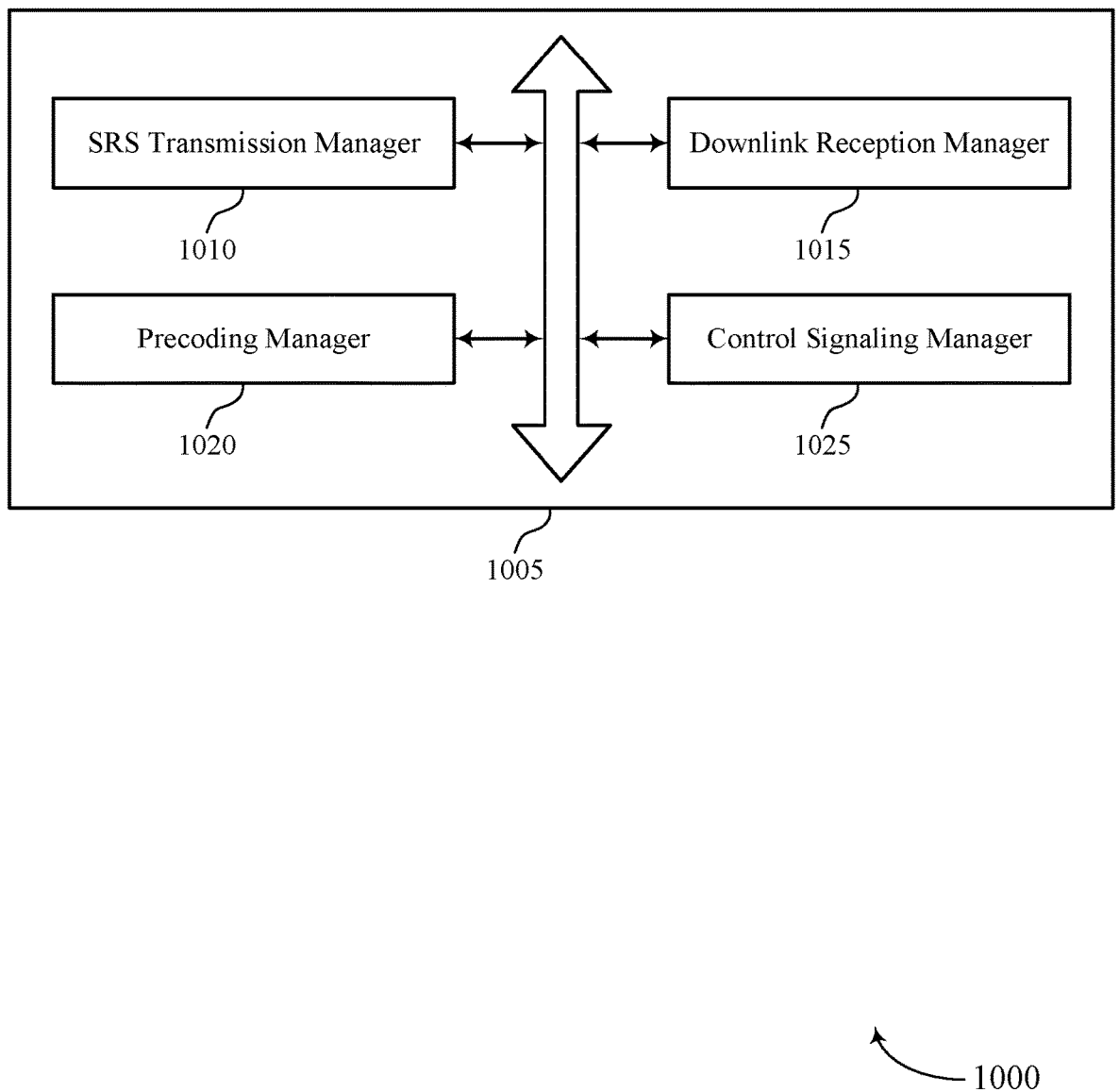
FIG. 10 shows a block diagram of a communications manager that supports paired SRS transmissions in multi-TRP operation in accordance with aspects of the present disclosure.

FIG. 10 shows a block diagram 1000 of a communications manager 1005 that supports paired SRS transmissions in multi-TRP operation in accordance with aspects of the present disclosure. The communications manager 1005 may be an example of aspects of a communications manager 815, a communications manager 915, or a communications manager 1110 described herein. The communications manager 1005 may include an SRS transmission manager 1010, a downlink reception manager 1015, a precoding manager 1020, and a control signaling manager 1025. Each of these modules may communicate, directly or indirectly, with one another (e.g., via one or more buses).

The SRS transmission manager 1010 may transmit a first SRS to a first TRP. In some examples, the SRS transmission manager 1010 may transmit, to a second TRP, a second SRS that is precoded to indicate at least one dimension of a received signal space corresponding to the downlink transmission. In some cases, transmitting the first SRS from a set of antenna ports, and where transmitting the second SRS further includes. In some instances, the SRS transmission manager 1010 may transmit the second SRS from at least a subset of the set of antenna ports. In some aspects, the SRS transmission manager 1010 may transmit the second SRS based on the rank of the downlink transmission, the precoding of the downlink transmission, or both. In some examples, the SRS transmission manager 1010 may transmit a third SRS to the first TRP. In some cases, the SRS transmission manager 1010 may transmit, to the second TRP, a fourth SRS that is precoded to indicate a second at least one dimension of the received signal space corresponding to the second downlink transmission, where a rank of the downlink transmission differs from a rank of the second downlink transmission. In some instances, an order in which the first SRS and the second SRS are transmitted in time is based on a priority metric.

The downlink reception manager 1015 may receive, from the first TRP, a downlink transmission that is based on the first SRS. In some examples, the downlink reception manager 1015 may receive a second downlink transmission from the second TRP based on the second SRS. In some cases, the downlink reception manager 1015 may receive, from the first TRP, a second downlink transmission that is based on the third SRS. In some instances, the downlink transmission is a beamformed downlink transmission. In some aspects, the downlink transmission is a physical downlink shared channel transmission.

The precoding manager 1020 may precode the second SRS for transmission along at least one dimension of the received signal space. In some examples, the precoding manager 1020 may precode the second SRS for transmission along a dimension that is not contained in the at least one dimension of the received signal space. In some cases, the precoding manager 1020 may determine a rank of the downlink transmission, a precoding of the downlink transmission, or both. In some instances, the received signal space includes one or more dimensions of an available signal space of the UE that are spanned by a signal including the downlink transmission.

The control signaling manager 1025 may receive control signaling that indicates a rank of the downlink transmission, a resource block allocation, or both. In some examples, the control signaling manager 1025 may receive, from the first TRP, control signaling indicating a resource set configuration for the first SRS. In some cases, the control signaling manager 1025 may receive, from the second TRP, second control signaling indicating a second resource set configuration for the second SRS. In some instances, the control signaling indicates a second resource set configuration for the second SRS. In some aspects, the resource set configuration indicates at least one parameter that is common to the first SRS and the second SRS.

Figure 11:
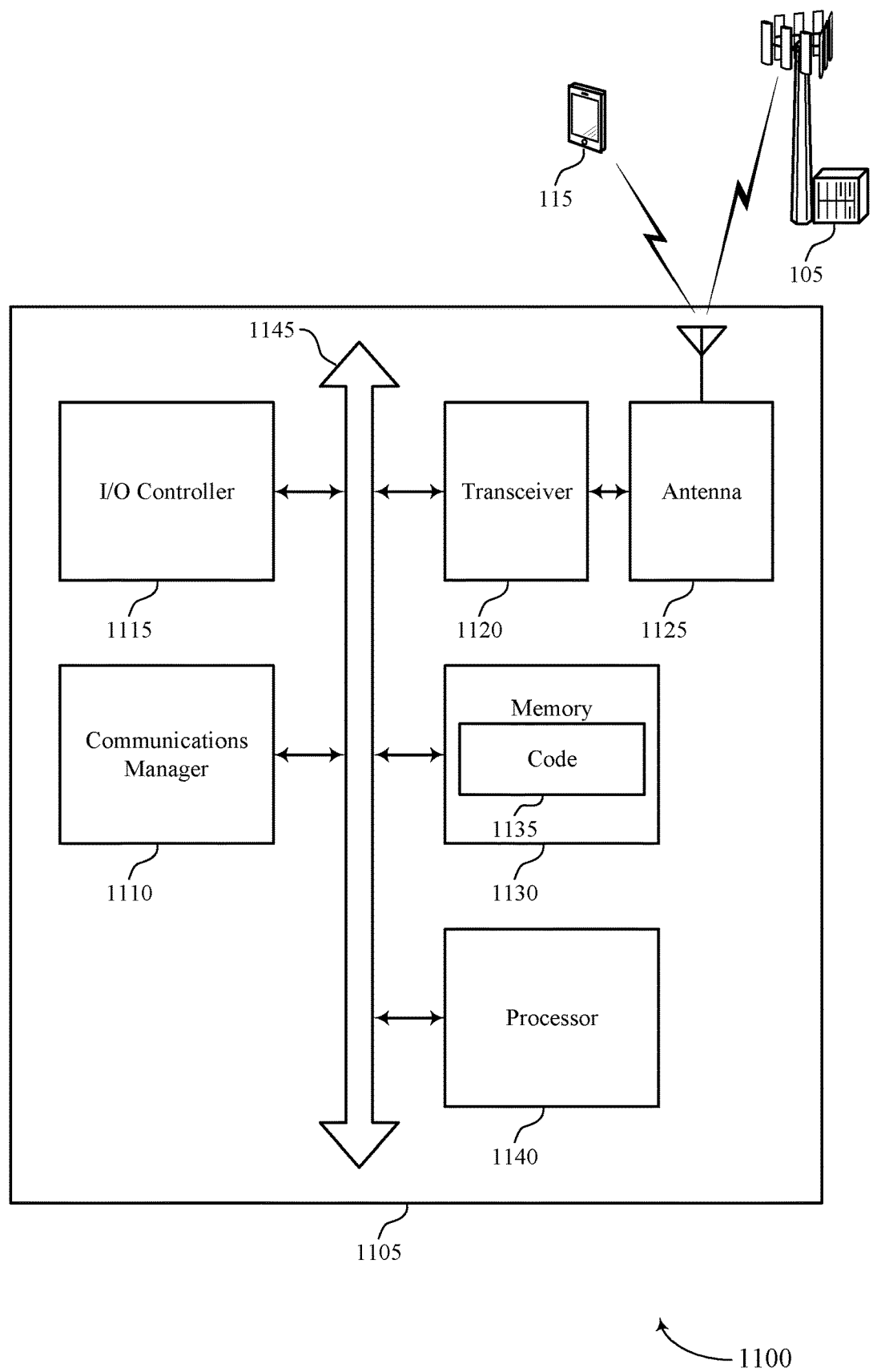
FIG. 11 shows a diagram of a system including a device that supports paired SRS transmissions in multi-TRP operation in accordance with aspects of the present disclosure.

FIG. 11 shows a diagram of a system 1100 including a device 1105 that supports paired SRS transmissions in multi-TRP operation in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may transmit a first SRS to a first TRP, transmit, to a second TRP, a second SRS that is precoded to indicate at least one dimension of a received signal space corresponding to the downlink transmission, and receive, from the first TRP, a downlink transmission that is based on the first SRS.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting paired SRS transmissions in multi-TRP operation).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
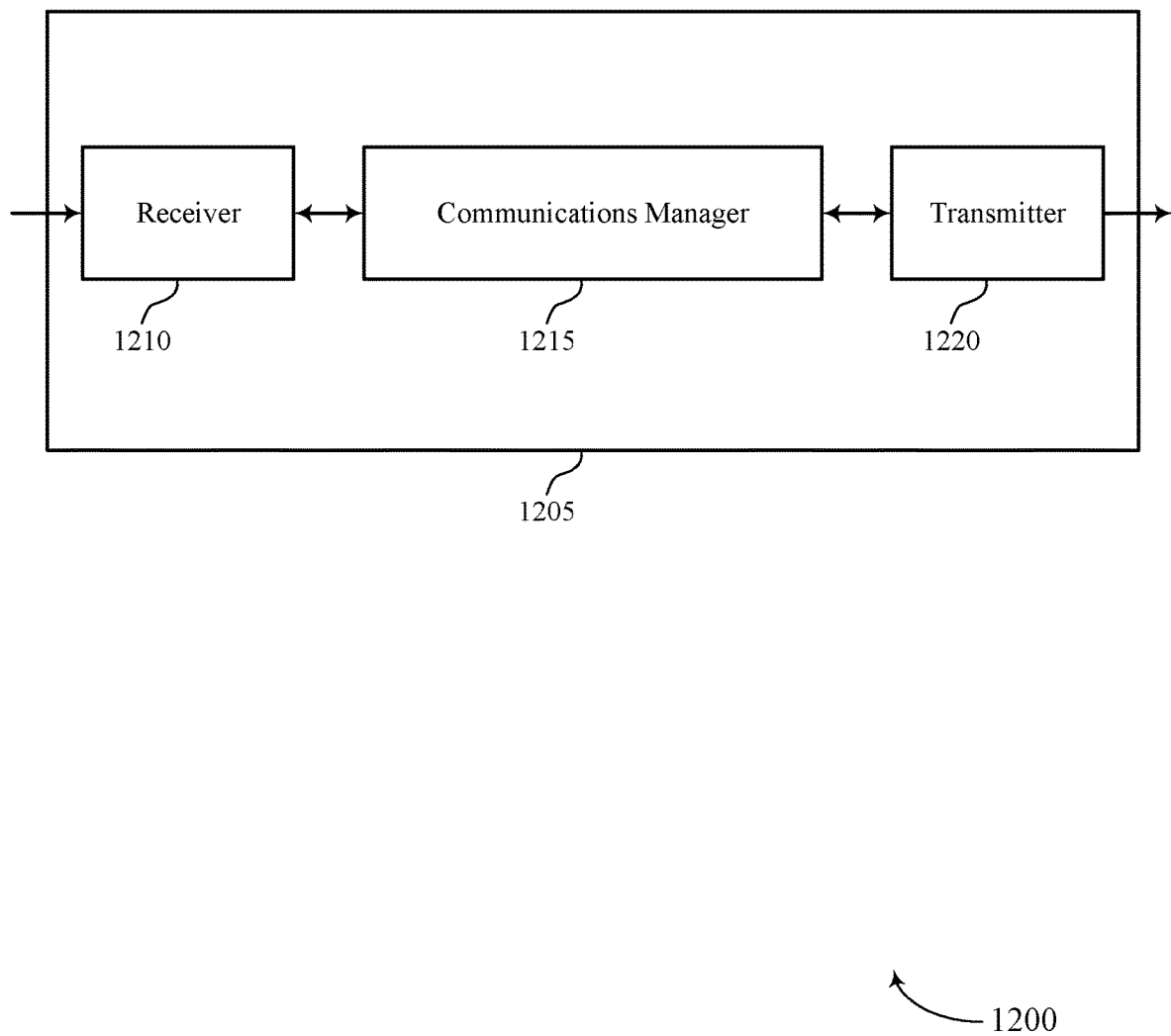
FIGS. 12 and 13 show block diagrams of devices that support paired SRS transmissions in multi-TRP operation in accordance with aspects of the present disclosure.

FIG. 12 shows a block diagram 1200 of a device 1205 that supports paired SRS transmissions in multi-TRP operation in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to paired SRS transmissions in multi-TRP operation). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may receive, from a first UE, a first SRS that is precoded to indicate at least one dimension of a received signal space corresponding to a first downlink transmission from a second TRP to the first UE and transmit a second downlink transmission based on the first SRS. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
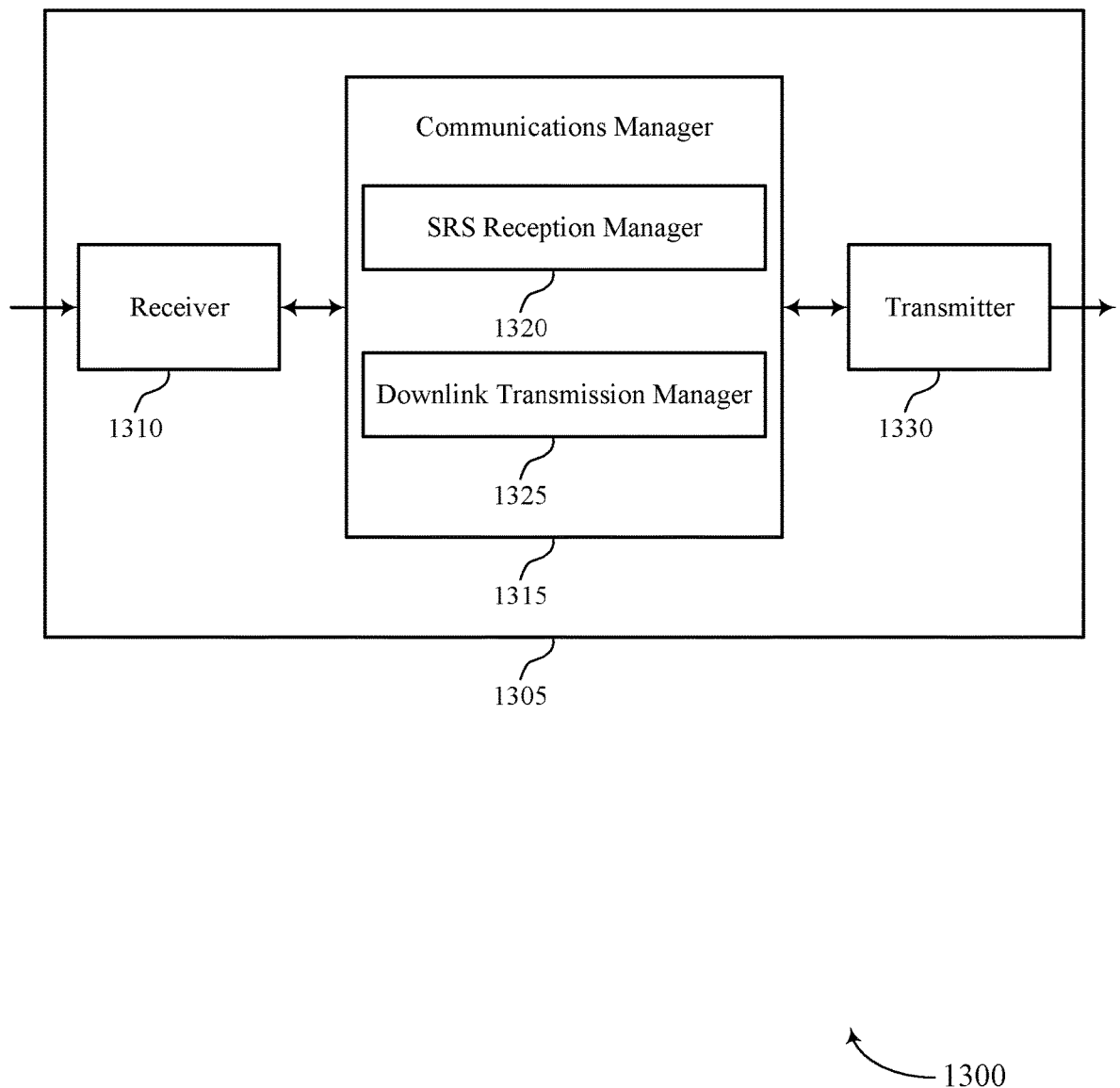

FIG. 13 shows a block diagram 1300 of a device 1305 that supports paired SRS transmissions in multi-TRP operation in accordance with aspects of the present disclosure. The device 1305 may be an example of aspects of a device 1205 or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to paired SRS transmissions in multi-TRP operation). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include an SRS reception manager 1320 and a downlink transmission manager 1325. The communications manager 1315 may be an example of aspects of the communications manager 1510 described herein.

The SRS reception manager 1320 may receive, from a first UE, a first SRS that is precoded to indicate at least one dimension of a received signal space corresponding to a first downlink transmission from a second TRP to the first UE.

The downlink transmission manager 1325 may transmit a second downlink transmission based on the first SRS.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
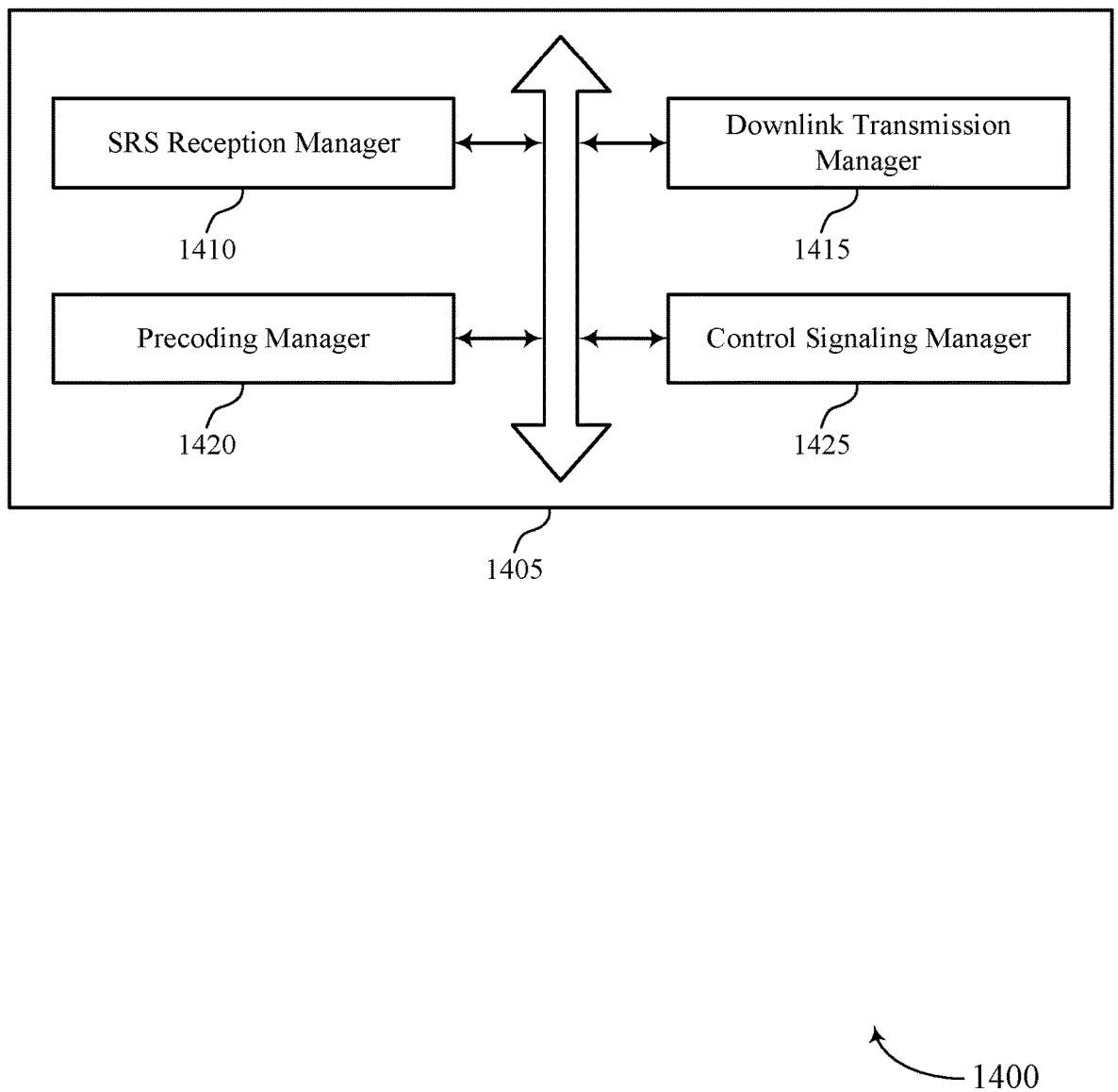
FIG. 14 shows a block diagram of a communications manager that supports paired SRS transmissions in multi-TRP operation in accordance with aspects of the present disclosure.

FIG. 14 shows a block diagram 1400 of a communications manager 1405 that supports paired SRS transmissions in multi-TRP operation in accordance with aspects of the present disclosure. The communications manager 1405 may be an example of aspects of a communications manager 1215, a communications manager 1315, or a communications manager 1510 described herein. The communications manager 1405 may include an SRS reception manager 1410, a downlink transmission manager 1415, a precoding manager 1420, and a control signaling manager 1425. Each of these modules may communicate, directly or indirectly, with one another (e.g., via one or more buses).

The SRS reception manager 1410 may receive, from a first UE, a first SRS that is precoded to indicate at least one dimension of a received signal space corresponding to a first downlink transmission from a second TRP to the first UE. In some cases, an order in which the first SRS and a second SRS are transmitted in time is based on a priority metric.

The downlink transmission manager 1415 may transmit a second downlink transmission based on the first SRS. In some examples, the downlink transmission manager 1415 may transmit the second downlink transmission to a second UE along a dimension determined based on first SRS. In some cases, the downlink transmission manager 1415 may transmit the second downlink transmission to the first UE via the at least one dimension indicated by the first SRS. In some instances, the downlink transmission manager 1415 may transmit the second downlink transmission based on the rank of the first SRS, the precoding of the first SRS, or both. In some aspects, the downlink transmission manager 1415 may determine at least one spatial parameter based on the first SRS. In some examples, the downlink transmission manager 1415 may transmit the second downlink transmission based on the at least one spatial parameter. In some cases, each of the first downlink transmission and the second downlink transmission is a beamformed downlink transmission. In some instances, each of the first downlink transmission and the second downlink transmission is a physical downlink shared channel transmission.

The precoding manager 1420 may determine a rank of the first SRS, a precoding of the first SRS, or both.

The control signaling manager 1425 may receive, from the second TRP, a resource set configuration for a second SRS. In some examples, the control signaling manager 1425 may transmit control signaling to configure the first UE to transmit the first SRS based on the resource set configuration. In some cases, the control signaling manager 1425 may transmit, to the first UE, the control signaling indicating a second resource set configuration based on the resource set configuration. In some instances, the resource set configuration indicates at least one parameter that is common to the first SRS and the second SRS.

Figure 15:
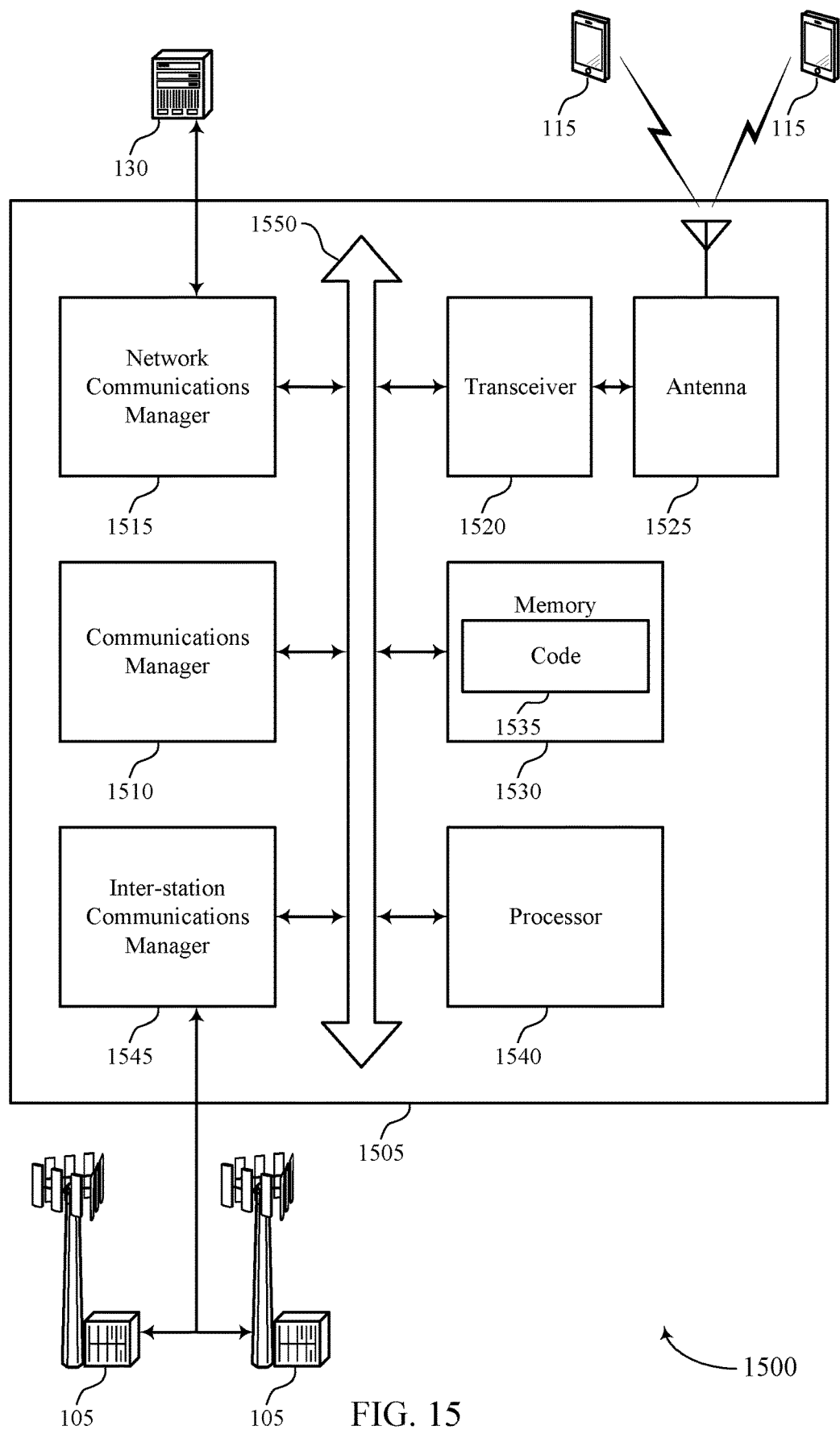
FIG. 15 shows a diagram of a system including a device that supports paired SRS transmissions in multi-TRP operation in accordance with aspects of the present disclosure.

FIG. 15 shows a diagram of a system 1500 including a device 1505 that supports paired SRS transmissions in multi-TRP operation in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may receive, from a first UE, a first SRS that is precoded to indicate at least one dimension of a received signal space corresponding to a first downlink transmission from a second TRP to the first UE and transmit a second downlink transmission based on the first SRS.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device #{device} to perform various functions (e.g., functions or tasks supporting paired SRS transmissions in multi-TRP operation).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
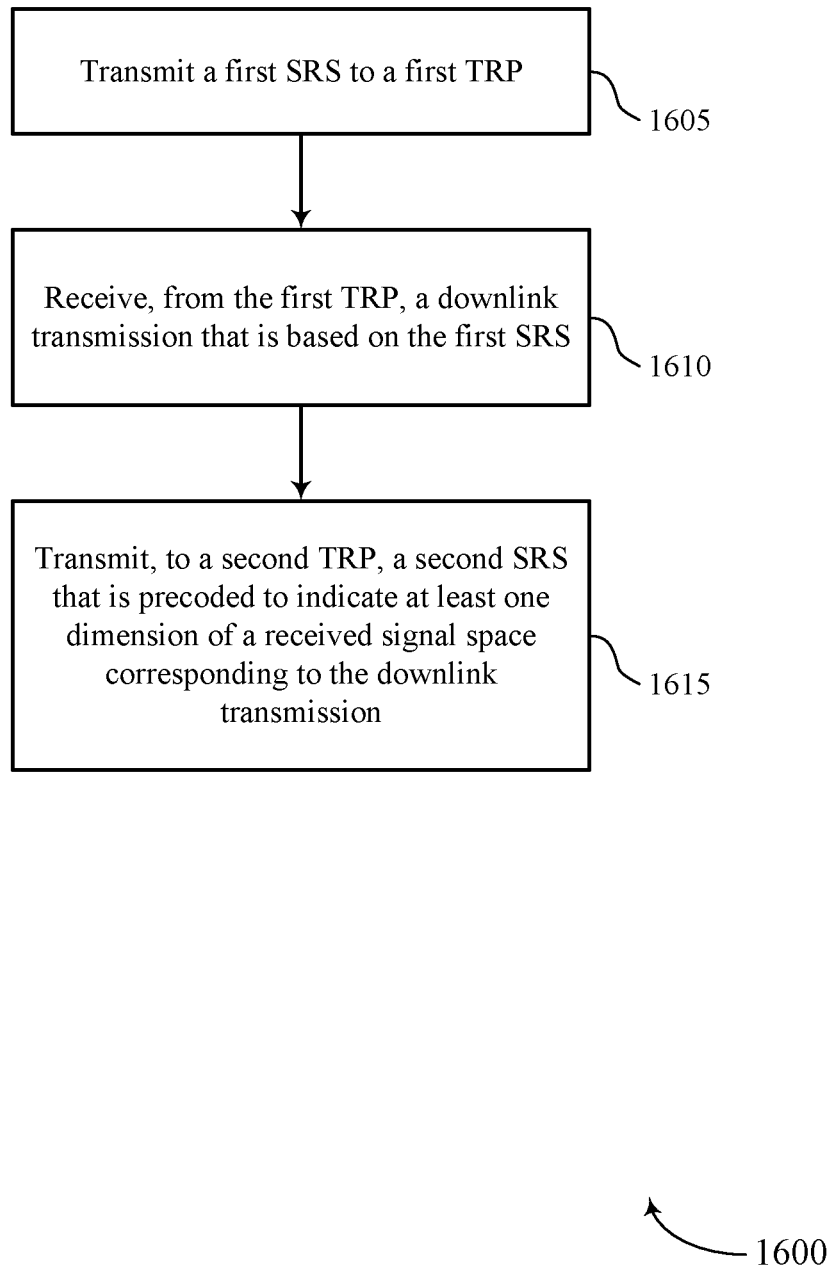
FIGS. 16 through 18 show flowcharts illustrating methods that support paired SRS transmissions in multi-TRP operation in accordance with aspects of the present disclosure.

FIG. 16 shows a flowchart illustrating a method 1600 that supports paired SRS transmissions in multi-TRP operation in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may transmit a first SRS to a first TRP. The operations of 1605 may be performed according to the methods described herein. In some examples, aspects of the operations of 1605 may be performed by an SRS transmission manager as described with reference to FIGS. 8 through 11.

At 1610, the UE may receive, from the first TRP, a downlink transmission that is based on the first SRS. The operations of 1610 may be performed according to the methods described herein. In some examples, aspects of the operations of 1610 may be performed by a downlink reception manager as described with reference to FIGS. 8 through 11.

At 1615, the UE may transmit, to a second TRP, a second SRS that is precoded to indicate at least one dimension of a received signal space corresponding to the downlink transmission. The operations of 1615 may be performed according to the methods described herein. In some examples, aspects of the operations of 1615 may be performed by an SRS transmission manager as described with reference to FIGS. 8 through 11.

Figure 17:
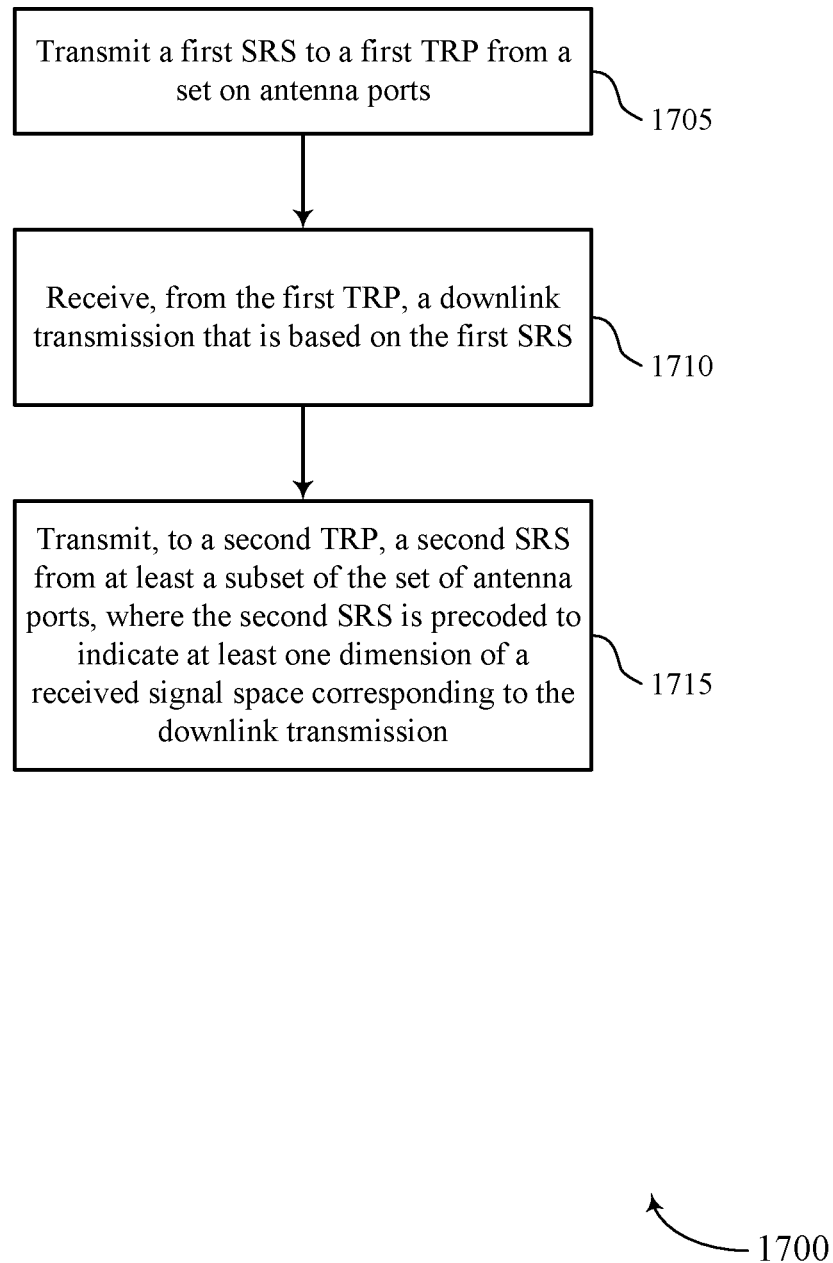

FIG. 17 shows a flowchart illustrating a method 1700 that supports paired SRS transmissions in multi-TRP operation in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may transmit a first SRS to a first TRP from a set of antenna ports. The operations of 1705 may be performed according to the methods described herein. In some examples, aspects of the operations of 1705 may be performed by an SRS transmission manager as described with reference to FIGS. 8 through 11.

At 1710, the UE may receive, from the first TRP, a downlink transmission that is based on the first SRS. The operations of 1710 may be performed according to the methods described herein. In some examples, aspects of the operations of 1710 may be performed by a downlink reception manager as described with reference to FIGS. 8 through 11.

At 1715, the UE may transmit, to a second TRP, a second SRS from at least a subset of the set of antenna ports, where the second SRS is precoded to indicate at least one dimension of a received signal space corresponding to the downlink transmission. The operations of 1715 may be performed according to the methods described herein. In some examples, aspects of the operations of 1715 may be performed by an SRS transmission manager as described with reference to FIGS. 8 through 11.

At 1720, the UE may transmit the first SRS from a set of antenna ports, and where transmitting the second SRS further includes. The operations of 1720 may be performed according to the methods described herein. In some examples, aspects of the operations of 1720 may be performed by an SRS transmission manager as described with reference to FIGS. 8 through 11.

At 1725, the UE may transmit the second SRS from at least a subset of the set of antenna ports. The operations of 1725 may be performed according to the methods described herein. In some examples, aspects of the operations of 1725 may be performed by an SRS transmission manager as described with reference to FIGS. 8 through 11.

Figure 18:
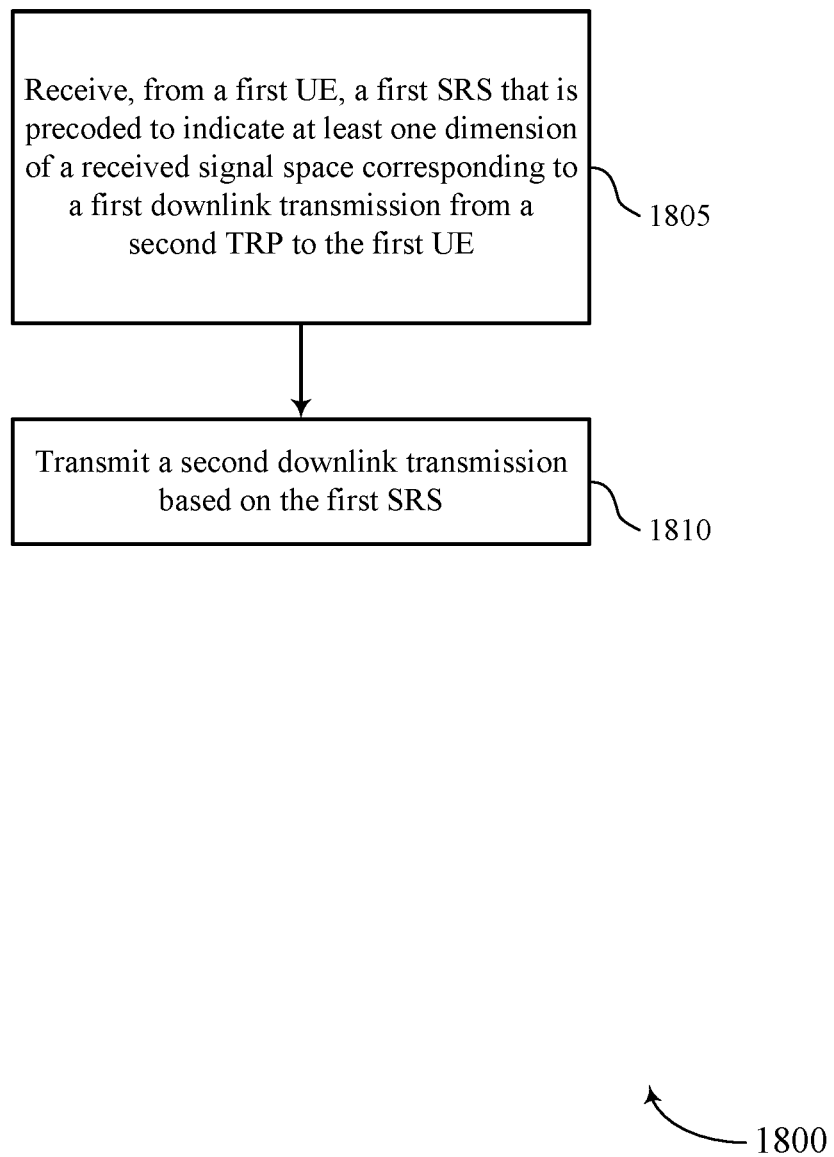

FIG. 18 shows a flowchart illustrating a method 1800 that supports paired SRS transmissions in multi-TRP operation in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the base station may receive, from a first UE, a first SRS that is precoded to indicate at least one dimension of a received signal space corresponding to a first downlink transmission from a second TRP to the first UE. The operations of 1805 may be performed according to the methods described herein. In some examples, aspects of the operations of 1805 may be performed by an SRS reception manager as described with reference to FIGS. 12 through 15.

At 1810, the base station may transmit a second downlink transmission based on the first SRS. The operations of 1810 may be performed according to the methods described herein. In some examples, aspects of the operations of 1810 may be performed by a downlink transmission manager as described with reference to FIGS. 12 through 15.

Embodiment 1

A method for wireless communication at a user equipment (UE), comprising: transmitting a first sounding reference signal to a first transmission reception point; receiving, from the first transmission reception point, a downlink transmission that is based at least in part on the first sounding reference signal; and transmitting, to a second transmission reception point, a second sounding reference signal that is precoded to indicate at least one dimension of a received signal space corresponding to the downlink transmission.

Embodiment 2

The method of embodiment 1, wherein transmitting the first sounding reference signal further comprises: transmitting the first sounding reference signal from a plurality of antenna ports, and wherein transmitting the second sounding reference signal further comprises: transmitting the second sounding reference signal from at least a subset of the plurality of antenna ports.

Embodiment 3

The method of embodiments 1 or 2, further comprising: receiving a second downlink transmission from the second transmission reception point based at least in part on the second sounding reference signal.

Embodiment 4

The method of any of embodiments 1 to 3, wherein transmitting the second sounding reference signal further comprises: precoding the second sounding reference signal for transmission along at least one dimension of the received signal space.

Embodiment 5

The method of any of embodiments 1 to 4, wherein the received signal space comprises one or more dimensions of an available signal space of the UE that are spanned by a signal comprising the downlink transmission.

Embodiment 6

The method of any of embodiments 1 to 5, wherein transmitting the second sounding reference signal further comprises: precoding the second sounding reference signal for transmission along a dimension that is not contained in the at least one dimension of the received signal space.

Embodiment 7

The method of any of embodiments 1 to 6, wherein transmitting the second sounding reference signal further comprises: determining a rank of the downlink transmission, a precoding of the downlink transmission, or both; and transmitting the second sounding reference signal based at least in part on the rank of the downlink transmission, the precoding of the downlink transmission, or both.

Embodiment 8

The method of any of embodiments 1 to 6, further comprising: receiving control signaling that indicates a rank of the downlink transmission, a resource block allocation, or both.

Embodiment 9

The method of any of embodiments 1 to 8, further comprising: receiving, from the first transmission reception point, control signaling indicating a resource set configuration for the first sounding reference signal.

Embodiment 10

The method of embodiment 9, wherein the control signaling indicates a second resource set configuration for the second sounding reference signal.

Embodiment 11

The method of any of embodiments 9 to 10, wherein the resource set configuration indicates at least one parameter that is common to the first sounding reference signal and the second sounding reference signal.

Embodiment 12

The method of any of embodiments 9 to 11, further comprising: receiving, from the second transmission reception point, second control signaling indicating a second resource set configuration for the second sounding reference signal.

Embodiment 13

The method of any of embodiments 1 to 12, further comprising: transmitting a third sounding reference signal to the first transmission reception point; receiving, from the first transmission reception point, a second downlink transmission that is based at least in part on the third sounding reference signal; and transmitting, to the second transmission reception point, a fourth sounding reference signal that is precoded to indicate a second at least one dimension of the received signal space corresponding to the second downlink transmission, wherein a rank of the downlink transmission differs from a rank of the second downlink transmission.

Embodiment 14

The method of any of embodiments 1 to 13, wherein an order in which the first sounding reference signal and the second sounding reference signal are transmitted in time is based at least in part on a priority metric.

Embodiment 15

The method of any of embodiments 1 to 14, wherein the downlink transmission is a beamformed downlink transmission.

Embodiment 16

The method of any of embodiments 1 to 14, wherein the downlink transmission is a physical downlink shared channel transmission.

Embodiment 17

A method for wireless communication at a first transmission reception point comprising: receiving, from a first user equipment (UE), a first sounding reference signal that is precoded to indicate at least one dimension of a received signal space corresponding to a first downlink transmission from a second transmission reception point to the first UE;

and transmitting a second downlink transmission based at least in part on the first sounding reference signal.

Embodiment 18

The method of embodiment 17, wherein transmitting the second downlink transmission further comprises: transmitting the second downlink transmission to a second UE along a dimension determined based at least in part on first sounding reference signal.

Embodiment 19

The method of embodiments 17 or 18, wherein transmitting the second downlink transmission further comprises: transmitting the second downlink transmission to the first UE via the at least one dimension indicated by the first sounding reference signal.

Embodiment 20

The method of any of embodiments 17 to 19, wherein transmitting the second downlink transmission further comprises: determining a rank of the first sounding reference signal, a precoding of the first sounding reference signal, or both; and transmitting the second downlink transmission based at least in part on the rank of the first sounding reference signal, the precoding of the first sounding reference signal, or both.

Embodiment 21

The method of any of embodiments 17 to 20, wherein transmitting the second downlink transmission further comprises: determining at least one spatial parameter based at least in part on the first sounding reference signal; and transmitting the second downlink transmission based at least in part on the at least one spatial parameter.

Embodiment 22

The method of any of embodiments 17 to 21, further comprising: receiving, from the second transmission reception point, a resource set configuration for a second sounding reference signal; and transmitting control signaling to configure the first UE to transmit the first sounding reference signal based at least in part on the resource set configuration.

Embodiment 23

The method of embodiment 22, wherein the resource set configuration indicates at least one parameter that is common to the first sounding reference signal and the second sounding reference signal.

Embodiment 24

The method of any of embodiments 22 to 23, wherein transmitting the control signaling further comprises: transmitting, to the first UE, the control signaling indicating a second resource set configuration based at least in part on the resource set configuration.

Embodiment 25

The method of any of embodiments 17 to 24, wherein an order in which the first sounding reference signal and a second sounding reference signal are transmitted in time is based on a priority metric.

Embodiment 26

The method of any of embodiments 17 to 25, wherein each of the first downlink transmission and the second downlink transmission is a beamformed downlink transmission.

Embodiment 27

The method of any of embodiments 17 to 25, wherein each of the first downlink transmission and the second downlink transmission is a physical downlink shared channel transmission.

Embodiment 28

An apparatus for wireless communication at a user equipment (UE), comprising: a processor; memory in electronic communication with the processor; and instructions stored in the memory and executable by the processor to cause the apparatus to perform a method of any of embodiments 1 to 16.

Embodiment 29

An apparatus for wireless communication at a first transmission reception point, comprising: a processor; memory in electronic communication with the processor; and instructions stored in the memory and executable by the processor to cause the apparatus to perform a method of any of embodiments 17 to 27.

Embodiment 30

A non-transitory computer-readable medium storing code for wireless communications, the code comprising instructions executable by a processor to perform a method of any of embodiments 1 to 16.

Embodiment 31

A non-transitory computer-readable medium storing code for wireless communications, the code comprising instructions executable by a processor to perform a method of any of embodiments 17 to 27.

Embodiment 32

An apparatus comprising at least one means for performing a method of any of embodiments 1 to 16.

Embodiment 33

An apparatus comprising at least one means for performing a method of any of embodiments 17 to 27.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting a first sounding reference signal to a first transmission reception point;
   receiving, from the first transmission reception point, a downlink transmission that is based at least in part on the first sounding reference signal; and
   transmitting, to a second transmission reception point, a second sounding reference signal that is precoded to indicate at least one dimension of a received signal space corresponding to the downlink transmission, wherein the received signal space comprises one or more dimensions of an available signal space of the UE that are spanned by a signal comprising the downlink transmission.

2. The method of claim 1, wherein transmitting the first sounding reference signal further comprises:
   transmitting the first sounding reference signal from a plurality of antenna ports, and wherein transmitting the second sounding reference signal further comprises:
   transmitting the second sounding reference signal from at least a subset of the plurality of antenna ports.

3. The method of claim 1, further comprising:
   receiving a second downlink transmission from the second transmission reception point based at least in part on the second sounding reference signal.

4. The method of claim 1, wherein transmitting the second sounding reference signal further comprises:
   precoding the second sounding reference signal for transmission along the at least one dimension of the received signal space.

5. The method of claim 1, wherein transmitting the second sounding reference signal further comprises:
   precoding the second sounding reference signal for transmission along a dimension that is not contained in the at least one dimension of the received signal space.

6. The method of claim 1, wherein transmitting the second sounding reference signal further comprises:
   determining a rank of the downlink transmission, a precoding of the downlink transmission, or both; and
   transmitting the second sounding reference signal based at least in part on the rank of the downlink transmission, the precoding of the downlink transmission, or both.

7. The method of claim 1, further comprising:
   receiving control signaling that indicates a rank of the downlink transmission, a resource block allocation, or both.

8. The method of claim 1, further comprising:
   receiving, from the first transmission reception point, control signaling indicating a resource set configuration for the first sounding reference signal.

9. The method of claim 8, wherein the control signaling indicates a second resource set configuration for the second sounding reference signal.

10. The method of claim 8, wherein the resource set configuration indicates at least one parameter that is common to the first sounding reference signal and the second sounding reference signal.

11. The method of claim 8, further comprising:
    receiving, from the second transmission reception point, second control signaling indicating a second resource set configuration for the second sounding reference signal.

12. The method of claim 1, further comprising:
    transmitting a third sounding reference signal to the first transmission reception point;
    receiving, from the first transmission reception point, a second downlink transmission that is based at least in part on the third sounding reference signal; and
    transmitting, to the second transmission reception point, a fourth sounding reference signal that is precoded to indicate a second at least one dimension of the received signal space corresponding to the second downlink transmission, wherein a rank of the downlink transmission differs from a rank of the second downlink transmission.

13. The method of claim 1, wherein an order in which the first sounding reference signal and the second sounding reference signal are transmitted in time is based at least in part on a priority metric.

14. The method of claim 1, wherein the downlink transmission is a beamformed downlink transmission.

15. The method of claim 1, wherein the downlink transmission is a physical downlink shared channel transmission.

16. A method for wireless communication at a first transmission reception point comprising:

receiving, from a first user equipment (UE), a first sounding reference signal that is precoded to indicate at least one dimension of a received signal space corresponding to a first downlink transmission from a second transmission reception point to the first UE, wherein the received signal space comprises one or more dimensions of an available signal space of the UE that are spanned by a signal comprising the first downlink transmission; and transmitting a second downlink transmission based at least in part on the first sounding reference signal.

17. The method of claim 16, wherein transmitting the second downlink transmission further comprises:

transmitting the second downlink transmission to a second UE along a dimension determined based at least in part on the first sounding reference signal.

18. The method of claim 16, wherein transmitting the second downlink transmission further comprises:

transmitting the second downlink transmission to the first UE via the at least one dimension indicated by the first sounding reference signal.

19. The method of claim 16, wherein transmitting the second downlink transmission further comprises:

determining a rank of the first sounding reference signal, a precoding of the first sounding reference signal, or both; and transmitting the second downlink transmission based at least in part on the rank of the first sounding reference signal, the precoding of the first sounding reference signal, or both.

20. The method of claim 16, wherein transmitting the second downlink transmission further comprises:

determining at least one spatial parameter based at least in part on the first sounding reference signal; and transmitting the second downlink transmission based at least in part on the at least one spatial parameter.

21. The method of claim 16, further comprising:

receiving, from the second transmission reception point, a resource set configuration for a second sounding reference signal; and transmitting control signaling to configure the first UE to transmit the first sounding reference signal based at least in part on the resource set configuration.

22. The method of claim 21, wherein the resource set configuration indicates at least one parameter that is common to the first sounding reference signal and the second sounding reference signal.

23. The method of claim 21, wherein transmitting the control signaling further comprises:

transmitting, to the first UE, the control signaling indicating a second resource set configuration based at least in part on the resource set configuration.

24. The method of claim 16, wherein an order in which the first sounding reference signal and a second sounding reference signal are transmitted in time is based on a priority metric.

25. The method of claim 16, wherein each of the first downlink transmission and the second downlink transmission is a beamformed downlink transmission.

26. The method of claim 16, wherein each of the first downlink transmission and the second downlink transmission is a physical downlink shared channel transmission.

27. An apparatus for wireless communication at a user equipment (UE), comprising: a processor, memory in electronic communication with the processor; and instructions stored in the memory and executable by the processor to cause the apparatus to:

transmit a first sounding reference signal to a first transmission reception point;

receive, from the first transmission reception point, a downlink transmission that is based at least in part on the first sounding reference signal; and transmit, to a second transmission reception point, a second sounding reference signal that is precoded to indicate at least one dimension of a received signal space corresponding to the downlink transmission, wherein the received signal space comprises one or more dimensions of an available signal space of the UE that are spanned by a signal comprising the downlink transmission.

28. The apparatus of claim 27, wherein the instructions are operable to cause to the apparatus to:

transmit the first sounding reference signal from a plurality of antenna ports; and transmit the second sounding reference signal from at least a subset of the plurality of antenna ports.

29. An apparatus for wireless communication at a first transmission reception point comprising, comprising: a processor, memory in electronic communication with the processor; and instructions stored in the memory and executable by the processor to cause the apparatus to:

receive, from a first user equipment (UE), a first sounding reference signal that is precoded to indicate at least one dimension of a received signal space corresponding to a first downlink transmission from a second transmission reception point to the first UE, wherein the received signal space comprises one or more dimensions of an available signal space of the UE that are spanned by a signal comprising the first downlink transmission; and transmit a second downlink transmission based at least in part on the first sounding reference signal.

* * * * *